United States Patent [19]

Putman

[11] Patent Number: 4,489,376
[45] Date of Patent: Dec. 18, 1984

[54] INDUSTRIAL PROCESS CONTROL APPARATUS AND METHOD

[75] Inventor: Richard E. Putman, Penn Hills Township, Allegheny County, Pa.

[73] Assignee: Westinghouse Electric Corp., Pittsburgh, Pa.

[21] Appl. No.: 367,828

[22] Filed: Apr. 12, 1982

[51] Int. Cl.³ .................. G05B 13/02; G06F 15/46
[52] U.S. Cl. ........................... 364/165; 266/80; 364/157; 364/158; 364/177; 431/20; 432/36
[58] Field of Search ............. 364/157, 164, 165, 177, 364/477, 503, 472; 318/561, 621, 622; 266/78, 80, 81, 83, 90, 96, 99; 432/24, 36, 37, 47, 51; 431/19, 20, 89

[56] References Cited

U.S. PATENT DOCUMENTS

| | | | |
|---|---|---|---|
| 3,051,462 | 8/1962 | Fennell | 432/4 |
| 3,199,852 | 8/1965 | Koinis et al. | 432/37 |
| 3,533,764 | 10/1970 | Togneri | 364/477 X |
| 3,758,762 | 9/1973 | Littman et al. | 364/165 |
| 3,772,504 | 11/1973 | Debray | 364/477 |
| 3,860,407 | 1/1975 | Fertik | 65/161 |
| 4,004,138 | 1/1977 | Morooka et al. | 364/164 X |
| 4,006,346 | 2/1977 | Pemberton | 364/165 X |
| 4,094,959 | 6/1978 | Ball et al. | 364/164 |
| 4,223,385 | 9/1980 | Miller et al. | 364/477 X |
| 4,255,133 | 3/1981 | Tanifuji et al. | 432/24 |
| 4,276,603 | 6/1981 | Beck et al. | 364/477 |
| 4,368,034 | 1/1983 | Wakamiya | 432/37 X |

OTHER PUBLICATIONS

Woodley–"Programming Aspects of Direct Digital Control"–Instrumentation in the Chemical and Petroleum Industries–vol. 2, pp. 149-159, Oct. 1965.

*Primary Examiner*—Joseph F. Ruggiero
*Attorney, Agent, or Firm*—E. Langer

[57] ABSTRACT

The present control system and method for controlling the combustion chamber pressure in a non-linear combustion process is operative in relation to one or more combustion chambers each having a flue gas damper. In the case of a plurality of such chambers, the outlet duct associated with each chamber is connected to a common exhaust stack. This operation is in relation to a desired damper position control characteristic provided by a combination of process signals in a microprocessor computer apparatus. Information in the form of the combustion and pressure levels as supplied in an anticipative feed-forward control manner by a particular combustion chamber is utilized in conjunction with a variable gain characteristic determined by the actual position of the damper operative with that combustion chamber to determine the correct damper position for that chamber.

11 Claims, 8 Drawing Figures

INDUSTRIAL PROCESS CONTROL APPARATUS AND METHOD

CROSS-REFERENCE TO RELATED APPLICATIONS

The present application is related to two concurrently filed patent applications (Ser. Nos. 367,831 and 367,830 filed Apr. 12, 1982) by the same inventor, which are assigned to the same assignee as the present application, and which are entitled "Industrial Process Control Apparatus and Method", the disclosures of which are incorporated herein by reference.

BACKGROUND OF THE INVENTION

It is known in the prior art that the control of non-linear combustion process operations such as combustion chamber pressure in boilers, furnaces or soaking pits is influenced by automatic control of the exhaust stack damper position. A piston-type servomotor utilizing compressed air is linked to the damper to control its movement. Many exhaust stacks rely on natural draft to draw the flue gas upward for discharge into the atmosphere. It is the reliance on natural draft only which introduces marked non-linearities in the relationship between the combustion chamber pressure and stack damper position. Contributing to this non-linearity is the resistance to flow introduced by the presence of a recuperator or economizer through which the spent gases pass, for purposes of preheating the air of combustion in the case of a furnace, or for preheating the water in the case of a boiler. Also, the stack draft itself tends to fall as the flow of flue gases increases, because the draft is a function of the flow as well as of the temperature difference between the top and the bottom of the stack. The updraft or suction at the bottom of the stack tends to be reduced for a constant temperature difference as the velocity of the flue gas coming into the bottom of the stack is increased.

The difficulty of controlling combustion chamber pressure in these environments is compounded by the common practice of discharging the flue gases of a plurality of combustion processes through a common stack. This difficulty is because of the tendency toward interaction of the dampers associated with each independent combustion process. An example of these problems is well illustrated by the circumstances of soaking pit operation.

Soaking pits are located in the steel production cycle between the basic oxygen furnace (BOF) where ingots are produced, and the slabbing mill. The BOF produces ingots of steel, either stainless or carbon steel. These ingots sit outside on trucks for a long period and cool off before they are placed in the slabbing mill. The purpose of the soaking pits is to raise the ingots to the desired rolling temperature, and because it takes quite a while for the heat to penetrate through the large tonnage of metal in each ingot, a soaking pit cycle may take eight hours between charging the ingots in the pit and withdrawing them for passage to the slabbing mill.

A typical arrangement would have these pits in batteries of three, with nine such batteries altogether, for a total of twenty-seven pits. The outlet duct from each of the pits in a battery is connected to a common stack provided for the battery of three pits and through which the flue gases are exhausted to the atmosphere. However, each pit has its own damper, which is a hinged, butterfly-type valve, moved by a piston-type servo motor that operates with compressed air. There is always some minimum opening of the pit damper to afford purging of the pit.

In industrial combustion processes, natural draft is commonly relied upon to draw the exhaust gases into the atmosphere, rather than induced draft fans, so that movement of the damper on one pit changes the pressure in the common duct and creates an interaction within the battery of pits as each damper moves in an attempt to maintain the pressure in its respective pit. There can be a constant instability that persists between the three pit pressure control systems, even through the combustion control, which is on the front-end of each pit for controlling the air and gas ratios, works well. Because the differential pressure is higher across their valves, interaction in the control of air and gas is not as significant as contrasted with interactions which take place through the stack.

The exhaust stack arrangement is such that an attempt is made to recover some of the heat going up the stack and transmit it to the input air of combustion through the use of recuperators which preheat the air before it gets to the burners.

The gases from each pit in a given battery flow through a separate exhaust system with its own damper, and a common stack is provided after the individual dampers. The natural draft characteristic of the system is critical in that it changes the normal pressure drop versus flow relationships and the damper position controller gain relationship to flow. Control of the damper position on each pit is very sensitive because the flow rates are not that high and changes in damper position cause changes in draft within a matter of two or three seconds.

The combustion controls associated with each pit respond to the independent variable of temperature which is the product of the combustion process. Temperature in the pit regulates the gas flow, and the gas flow regulates the air flow, and as is commonly found on combustion systems, a cross-coupling and ratio adjustment exists between the air and gas flows arranged so that neither can get out of step with the other while providing a desired fuel quantity and air/fuel ratio.

The control for each damper senses the actual static pressure in the associated pit, and this pressure should be controlled quite closely. If it is too low, or a highly negative pressure, then cold air can be sucked in and the pit cannot properly heat up the ingots. Ingot scaling will also occur. If it is too high, or a positive pressure, the hostile atmosphere within the pit might be blown out into the shop which is both a fire hazard and dangerous to shop personnel.

Conventional pit firing utilizes a modulated firing technique in which the temperature excursions in a temperature versus time profile continuously modulate the fuel gas flow to maintain whatever temperature is specified in the profile for that pit. The fuel gas flow would be fully on when the pit is first started, and gradually tapers off to some very low value as the desired soaking temperature is approached. These pits are not only capable of being fired in the conventional way with modulated firing, but can also be fired with a technique called pulse-firing, with which the pit interactions discussed earlier can become very troublesome.

Pulse-firing creates tremendous external disturbances which are not present with modulated firing where there is some trimming taking place all the time. This is because the pulse-firing technique involves firing the pit at full blast to bring it up to desired temperature as quickly as possible. The fuel gas is then cut off completely and the pit cools down slightly, from about 2480° F. to 2372° F. At 2372° F. the fuel gas is turned on again. About 2½-3 minutes later, when the temperature again reaches about 2480° F., the gas is turned off again. The firing operation keeps pulsing up and down like this all the time, with the pulse being simply a complete full blast on or nothing at all. As the soaking condition is approached, the duration of the off time increases because the whole atmosphere surrounding the ingots is hotter and more uniform in temperature, so there is less decay in temperature when the gas is turned off. An indication that soaking temperature has been reached is provided by the increase in duration of the off time to a certain magnitude.

The nature of the pulse-firing technique is such that it introduces very severe changes in the input fuel gas flow every time the pulse occurs. Thus, the interaction between the pits can become very significant. Clearly, both the magnitude and rate of change in flow are large when this occurs and the effect on the other pits is severe. Further, because the pits are at different stages in their heating cycles, there can be no synchronism in the sequence of pulsing in the respective pits.

The pulse-firing technique has many advantages over modulated firing. Two of the major benefits of the pulse firing technique are improved heat utilization and increased yield of ingots through reduced scale formation. These stem from the fact that the pulse-firing technique exhibits only two states; firing the pit at full bore or not at all. With modulated firing, a very low fuel gas flow requires a lot of excess air to provide the necessary turbulence, which is not very efficient. When firing at full bore under pulse firing, on the other hand, the air/fuel ratio can be adjusted downward so that it is much closer to stoichiometric and nearer to a slightly reducing atmosphere. This also makes the excess air much lower and therefore the ingots do not scale as much leading to a better ingot yield. Overall, pulse-firing is much more efficient in terms of heat utilization.

It can be readily seen that the pulse-firing technique greatly magnifies the aforementioned interactions between the individual pit damper control systems and greatly complicates the operation of any one damper control system. This is because the typical 2,400 pounds per hour of fuel gases which were flowing suddenly stop. The sudden curtailment of fuel gas flow in any particular pit calls for a step change in damper position owing to the sudden increase in natural draft as the affected damper shuts down, and the other pits close in their dampers in response to the sudden increase in draft. There is a tendency for a damper movement on one pit to affect the control of pressure in the others, leading to instability unless the damper position controllers are detuned.

The present invention overcomes these problems, resulting in a control system which exhibits greater stability and higher speed of improved accuracy and response over a 100% load range. This invention has commercial value because of the large number of pits and furnaces to which part or all of the invention applies whether they are operating in batteries or alone. The improved accuracy and response of the system permits the adjustment of the furnace pressure set point closer to atmospheric pressure, to reduce the amount of cold air leaking in through the furnace cover, with an associated saving in fuel gas being provided.

SUMMARY OF THE INVENTION

The present invention relates to the control of a non-linear process operation, and more specifically to the control of the combustion pressure within a process operation such as a soaking pit having a movable exhaust gas damper. A damper position control loop is provided having a non-linear feed-forward signal generated from the change in fuel gas flow into the pit, which signal is then modified by the application of an improved lead/lag algorithm with suppressed decay designed to keep the pit pressure essentially constant or slightly negative in response to fuel gas flow changes. In addition, there is a variable gain control which permits the damper to be positioned with stability because the gain is varied in response to variations in the ratio of the change of flue gas flow relative to the change in damper position. This achieves an improved dynamic behavior over the entire range of damper travel. All of the above control features apply to a single isolated combustion process unit as well as to a multiplicity of such units.

GENERAL DESCRIPTION OF A PREFERRED EMBODIMENT

Figure 1:
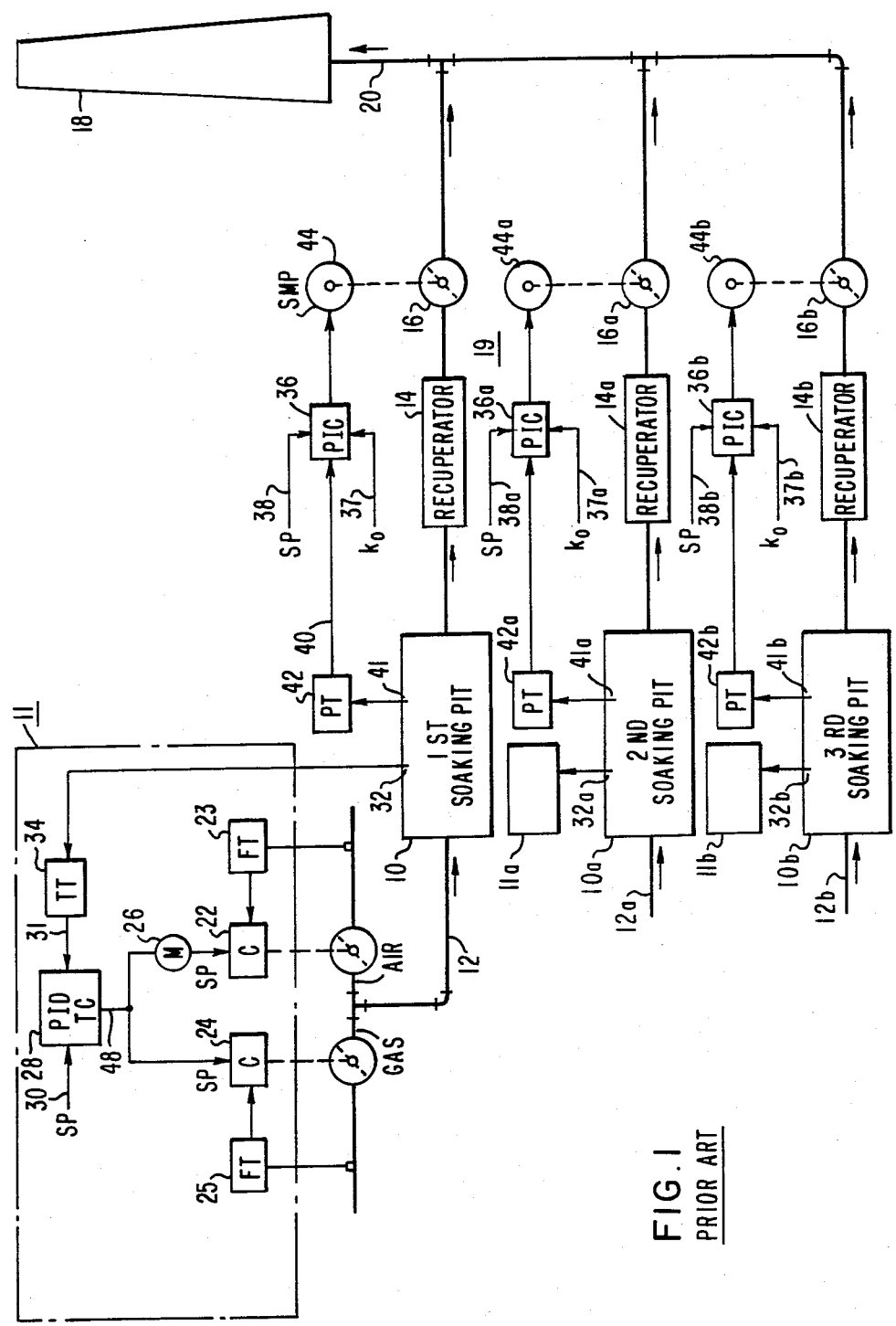
FIG. 1 is a prior art control schematic showing the flue gas path in a battery of three soaking pits beginning with the products of combustion which flow from a soaking pit, through the recuperator, past the pit damper, and into the atmosphere through the exhaust stack.

The non-linear combustion process control apparatus and method in accordance with the present invention is operative to provide an improved operation of the individual pressure control systems associated with each of several combustion processes such as furnaces, soaking pits or boilers, any one of which is equipped with a recuperator or economizer through which spent flue gases pass for discharge into a common stack subject to natural draft. Each pressure control system determines the position of a damper which acts to maintain a desired furnace combustion pressure, and the position of the damper is changed in response to the output of a damper position control program implemented with a microprocessor computer apparatus, with one such microprocessor being applied to control a battery of three soaking pits.

The herein disclosed simulation and analysis of a soaking pit, its flue gas path and pit pressure control system addresses the following process characteristics, which are also common to furnaces and boilers:

(1) The three soaking pits are typically discharged into a common exhaust gas stack, and while each pit is provided with its own damper, the pit pressure control loops exhibit interaction through the common stack due to the sudden changes in flow induced by the pulse-firing associated with each pit.

(2) The availability of only natural or stack draft to pull the exhaust gases from the pits reinforces these interactions and introduces non-linearities in the system.

(3) Large combustion process level changes typically occur over short periods of time presenting the danger that positive combustion chamber pressure will be created during these changes.

(4) The inherent cycle time limitations of a microprocessor create a varying iteration interval which has an effect on control system stability. Also, microprocessor memory space considerations dictate the need for control programs which are compact.

The present invention simulates the flue gas pressure drop in the exhaust train of equipment from the pit, across the recuperators, the duct work and the stack damper. The simulation is incorporated in a control algorithm that anticipates, for a given battery of pits, the position change on at least one other damper if a particular damper is moved. Similarly, the change in position of a third damper produced by the movement of the second damper is anticipated. Resolution of this decoupling before any damper position change is made and related with modification of all damper positions simultaneously, minimizes the undesired pit operation interaction. The control of the three pits as here described by one microprocessor facilitates this decoupling control procedure. The aforementioned resolution for each of pit A, pit B, and pit C is provided by passage through a decoupling matrix to generate the respective resolved damper position outputs which are a synthesis of the three initially desired damper position outputs, and then the individual dampers are moved simultaneously.

The herein disclosed application of the decoupling algorithm acts to minimize the undesired interaction of the individual pit pressure control systems which is introduced by the very severe changes in gas flow inherent in the pulse-firing technique. Implementation of the decoupling algorithm on a microprocessor-based computer accomplishes the purpose of the algorithm through the inherent discontinuities of a logical device. A set of system information is gathered, processed, and that set is passed back again in a processed form.

The decoupling concept is useful in other process applications, such as in steam turbine-generator control and in energy management systems, where several turbo generators with extraction valves, governors, and reducing valves, are applied in a system. Changes made to the control devices associated with any one generator, if made on a serial basis, will cause a response from another generator due to natural feedback and thereby complicate the procedure of trying to bring the whole plant to a new desired steam/power distribution level. For example, to decouple a plurality of devices from one another, the decoupling concept permits assessment of the effect the desired change on any one device will have on the others, so that the resolved desired change for each can be generated and implemented simultaneously on al the devices. In boiler control systems, it is a widespread practice to pass the flue gases from several boilers into a common flue and this creates similar interaction problems where there is a load change in response to a change in process steam demand.

The non-linearity of the behavior of the respective dampers and soaking pits creates the need for a control operation in which both the current damper position and the gain on the damper position controller are adjusted in response to the total amount of fuel being fired. The herein disclosed control operation incorporates a non-linear feed-forward signal and variable gain control operation for accomplishing these adjustments.

DETAILED DESCRIPTION OF A PREFERRED EMBODIMENT

Referring now to FIG. 1, a prior art flue gas path for a battery 19 of three soaking pits is shown. The components associated with the second pit and the third pit, respectively, are designated a and b in FIG. 1 and the description applies to each of the three soaking pits. Each pit includes a pit chamber 10 which is supplied with the products of combustion of coke oven gas 12 at a temperature of approximately 2550° F. and flow rate of approximately 5000 pounds per hour. The exhaust gases are drawn out of the pit chamber 10 at a temperature of about 2200° F. and are passed through a gas/air heat exchanger or recuperator 14 and leave at a temperature of about 1000° F. to pass through an adjustable damper 16 on the way through outlet duct 20 to the stack 18, which stack 18 is common to the battery 19 of three similar soaking pits. The draft condition within the pit 10 is assumed to be −0.1 inches of water, which is increased to −0.727 inches of water leaving the recuperator 14, then leaving the damper 16 further increased to −0.9627 inches of water, reaching −1.1688 inches of water at the bottom of the stack 18. As shown in FIG. 1, each pit has its own damper 16, with the three pits discharging into the outlet duct 20 at sequential points. A prior art combustion control apparatus 11 is shown including two independent controllers (C) 22 and 24 operative with respective flow transmitters (FT) 23 and 25, with the controller 22 being operative with the air control loop and the controller 24 being operative with the fuel gas flow control loop, with a ratio function provided by a multiplier 26 between them to provide a desired fuel to air ratio. Each independent controller derives its set point from a fuel gas demand disturbance signal 48 provided by a master temperature controller (PIDTC) 28 which is controlled by a set point 30 and a feedback signal 31 from a temperature thermocouple 32 and temperature transmitter (TT) 34 operative with the pit. In addition, a prior art damper position proportional plus integral controller apparatus (PIC) 36 is shown which operates from the combination of an externally adjustable root proportional gain ($k_o$) 37, a set point signal 38, and a pressure feedback signal 40 which is fed from a pressure transmitter (PT) 42 and obtained via pressure tap 41 in the pit 10. The controller apparatus 36 outputs to a servomotor positioner (SMP) 44 that mechanically controls the position of the damper 16.

Figure 2:
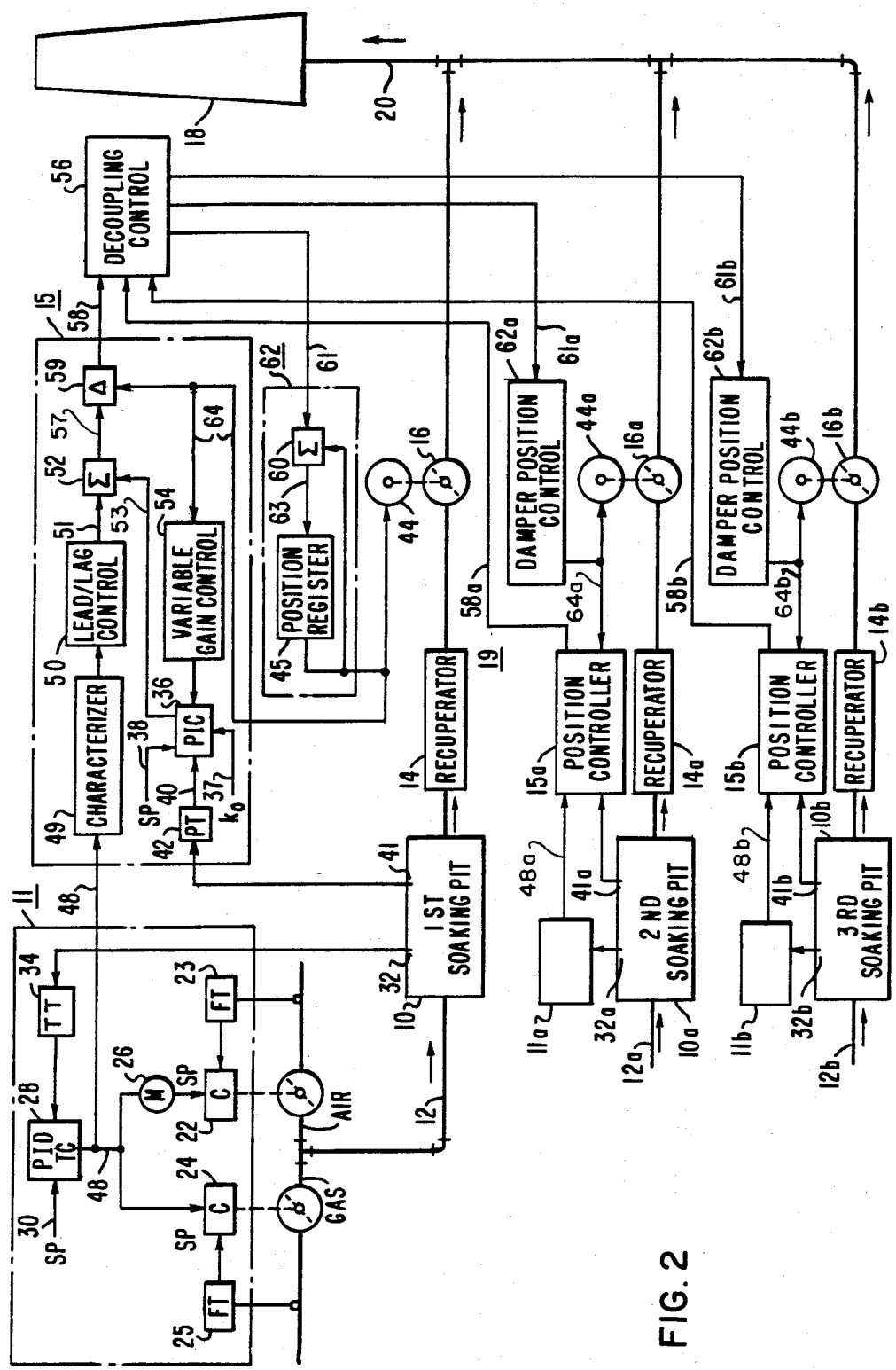
FIG. 2 is a control schematic in accordance with the present invention as applied to a battery of three soaking pits.

In FIG. 2 there is shown a similar battery 19 of three soaking pits, with each pit 10 including a combustion control apparatus 11 similar to the combustion control apparatus 11 shown in FIG. 1. The position controller 15 is supplied in a feed-forward manner with the external disturbance fuel gas demand signal 48 which is passed to a characterizer 49 and is then processed through the lead/lag control block 50 to provide a modified feed-forward signal 51 which is fed to the summer ($\Sigma$) 52 at which point the output 53 from the damper position PI controller 36 is added to generate the desired damper position signal 57 which is compared to the present actual damper position signal in comparator ($\Delta$) 59 to generate a desired delta position signal 58 so transforming the output of the combined PI controller and lead/lag control block into the velocity algorithm form. The desired delta position signal 58 is fed to a decoupling control 56 which generates a modified delta signal 61 which is then fed to a summer ($\Sigma$) 60 within damper position control 62 and at which point the modified delta signal 61 is added to the present damper position to provide the new desired damper position signal 63, which is used to update the present damper position register 45. The updated position signal 64 is fed to the servomotor positioner 44 for the damper 16. In addition, the updated position signal 64 corresponding to the new actual position of the damper 16 is also fed to a variable gain control block 54 within the damper position control 15, which variable gain control block 54 acts to vary the gain of the damper position PI controller 36 as a function of damper position.

A second soaking pit includes a pit chamber 10$a$ and a recuperator 14$a$ operative through a damper 16$a$ with the common stack 18. The pressure of pit chamber 10$a$ from pressure tape 41 and the feed-forward signal 48$a$ of the fuel gas demand for the pit chamber 10$a$ are supplied to the damper position control 15$a$. The desired damper position signal is compared to the present actual damper position signal in a comparator to generate a desired delta position signal 58$a$ which is supplied to the decoupling control 56. The modified delta signal 61$a$ is generated and fed to a summer to provide the new desired damper position signal which is used to update the present damper position register within the damper position control 62$a$. The new actual position of the damper 16$a$ as represented by signal 64$a$ is then fed both to the servomotor positioner 44$a$ and to a variable gain control block 54$a$ within the damper position control 15$a$ which variable gain control block is used to vary the damper position controller gain.

A third soaking pit includes a pit chamber 10$b$ and a recuperator 14$b$ operative through a damper 16$b$ with the common stack 18. The pressure of pit chamber 10$b$ and the feed-forward signal 48$b$ of the fuel gas demand for the pit chamber 10$b$ are supplied to the position controller 15$b$. The desired damper position signal is compared to the present actual damper position signal in a comparator to generate a desired delta position signal 58$b$ which is supplied to the decoupling control 56. The modified delta signal 61$b$ is generated and fed to a summer to provide the new desired damper position signal which is used to update the present damper position register within the damper position control 62$b$. The new actual position of the damper 16$b$ as represented by signal 64$b$ is then fed both to the servomotor positioner 44$b$ and to a variable gain control block 54$b$ within the damper position control 15$b$ which variable gain control block is used to vary the damper position controller gain.

Figure 3:
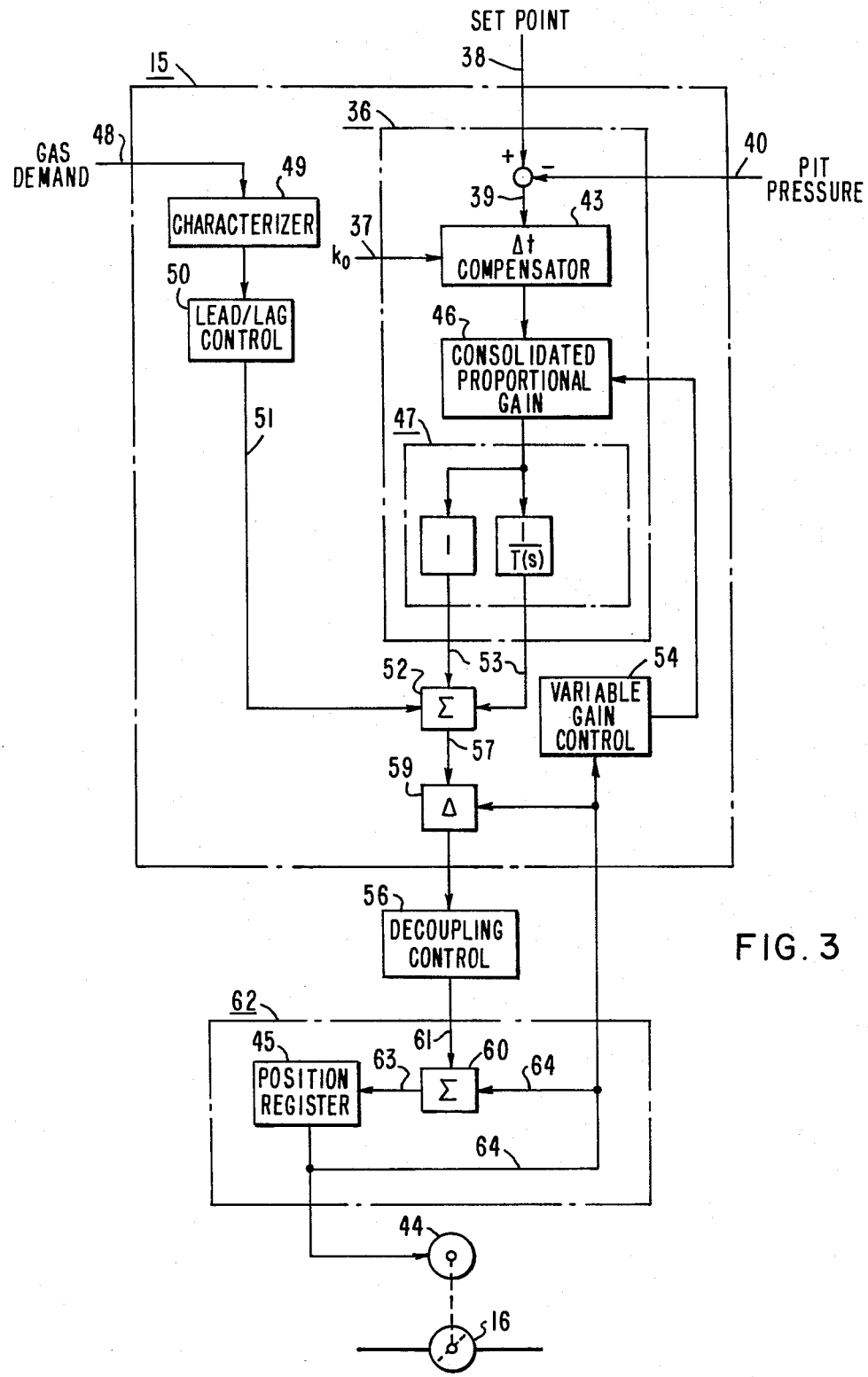
FIG. 3 shows a function block diagram for the damper position control loop apparatus in accordance with the present invention.

In FIG. 3 there is shown a control loop function block diagram which includes the damper position control 15 having a damper position PI controller 36 which is fed by the error signal 39 generated in a node by the comparison of a positive set point signal 38 and a negative pressure feedback signal 40. The position controller 15 is supplied in a feed-forward manner with the fuel gas demand signal 48 which is passed to a characterizer 49 and is then processed through the lead/lag control block 50 to provide a modified feed-forward signal 51 which is fed to the summer 52 at which point the output 53 from the damper position PI controller 36 is added to generate the desired damper position signal 57 which is compared to the present actual damper position signal in comparator 59 to generate a desired delta position signal 58 so transforming the output of the combined PI controller and lead/lag control block into the velocity algorithm form. The desired delta position signal 58 is fed to a decoupling control 56 which generates a modified delta signal 61 which is then fed to a summer 60 within damper position control 62 at which point the modified delta signal 61 is added to the present damper position to provide the new desired damper position signal 63, which is used to update the present damper position register 45. The updated position signal 64 is fed to the servomotor positioner 44 for the damper 16. In addition, the updated position signal 64 corresponding to the new actual position of the damper 16 is also fed to a variable gain control block 54 within the damper position control 15, which variable gain control block 54 acts to vary the gain of the damper position PI controller 36 as a function of damper position.

Figure 4A:
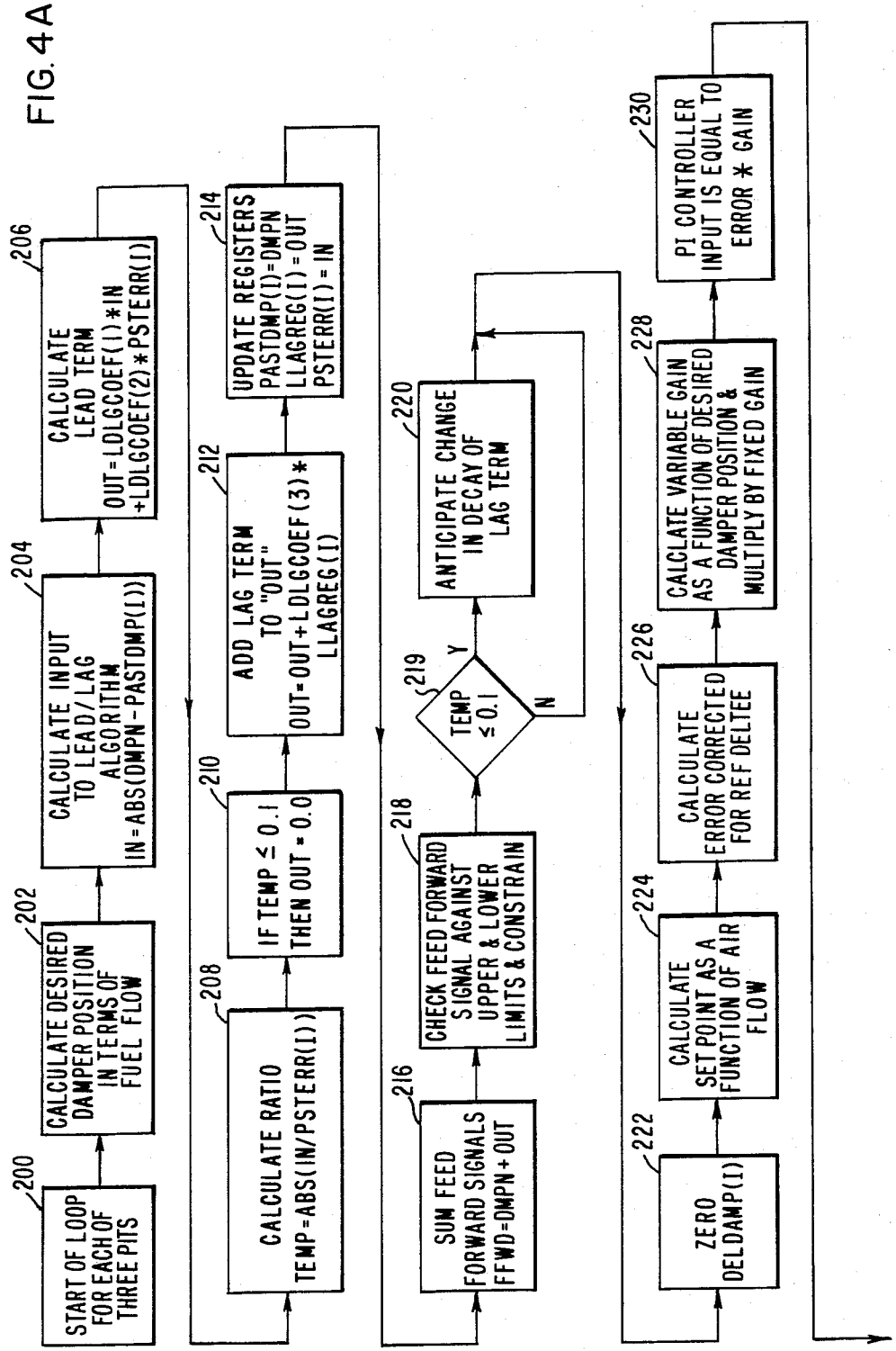
FIGS. 4A, 4B and 4C show a control program flow chart that operationally corresponds with the function block diagram of FIG. 3.
Figure 4B:
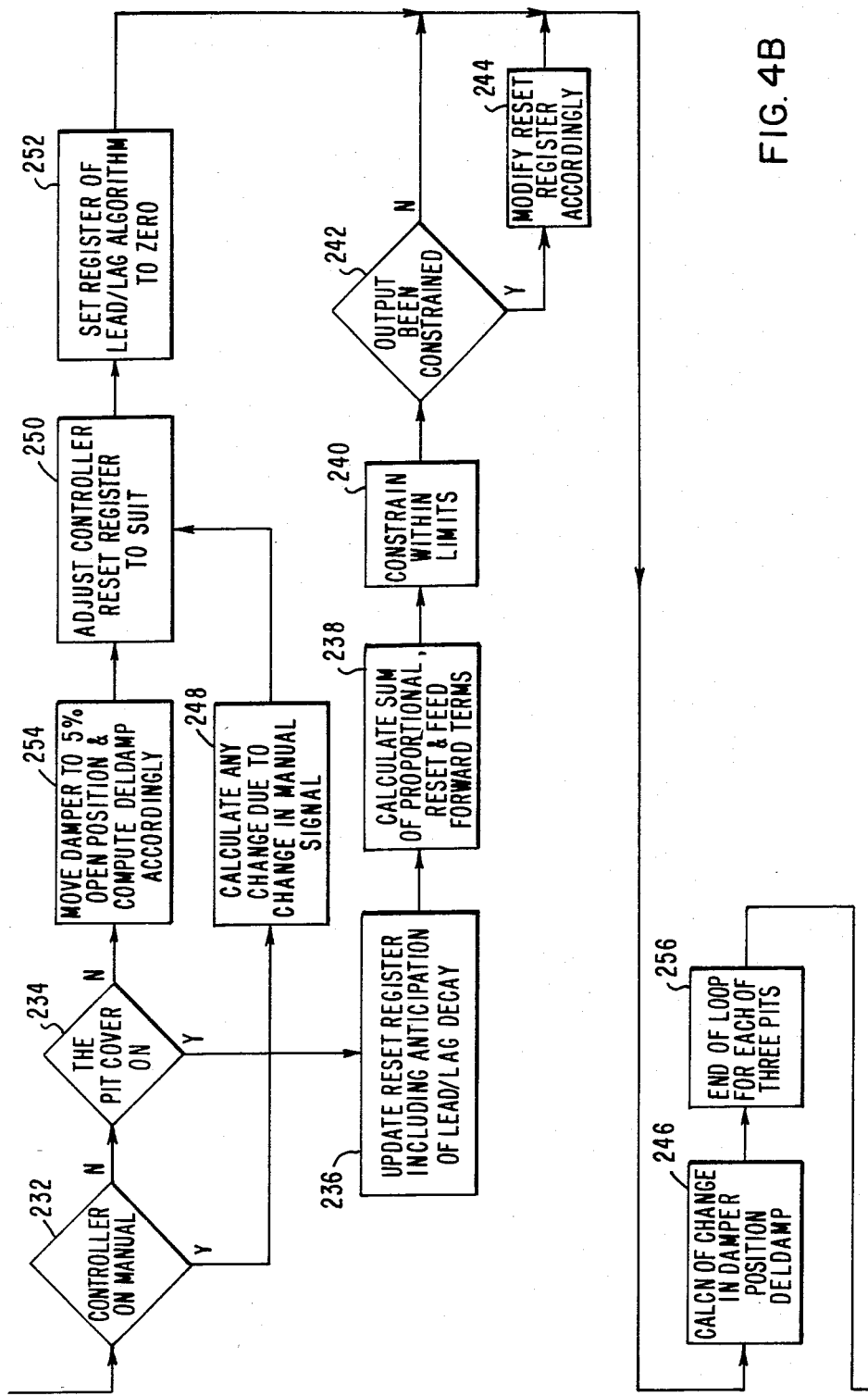
Figure 4C:
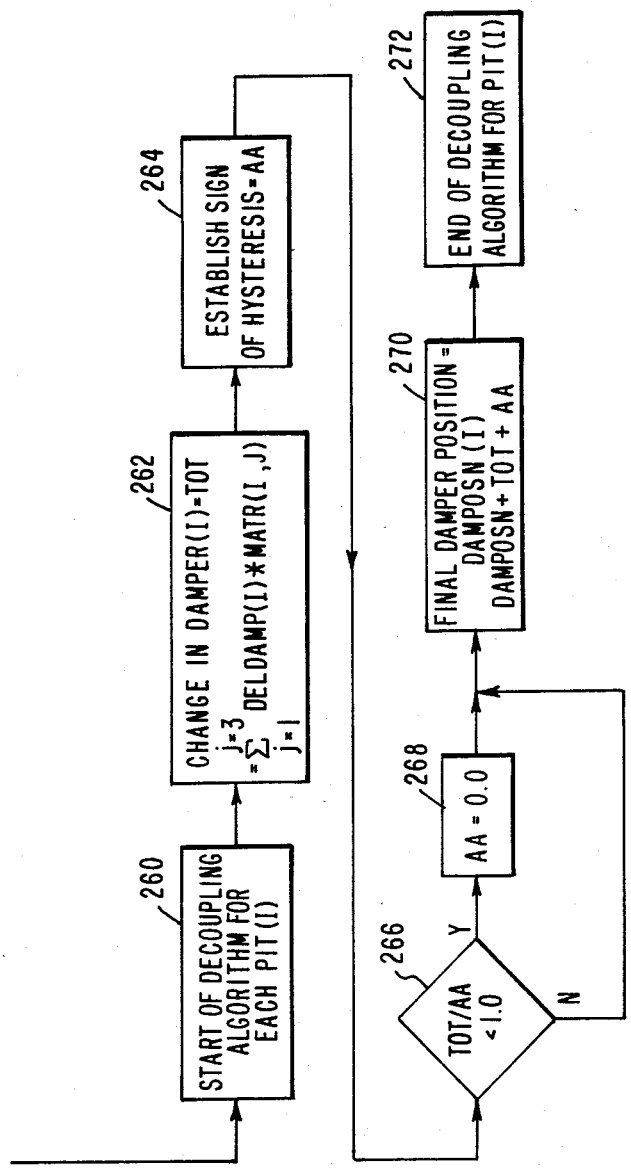

The program flow chart shown in FIGS. 4A, 4B and 4C functionally corresponds with the function block diagram shown in FIG. 3. FIGS. 4A and 4B illustrate the determination of the desired change in damper position for each of three pits, one after the other. Then FIG. 4C illustrates the operation of the decoupling algorithm, with the hysteresis if any being added, such that the final damper position for each pit is determined.

In FIG. 4A, block 200 is the start of the program loop for each of three pits. In block 202 there is calculated the desired damper position in terms of fuel flow, and this is a non-linear function. In block 204 the net input to the lead/lag algorithm is calculated as the absolute difference between the new desired damper position and the desired damper position value calculated at the last iteration of the program. The lead term OUT is then calculated in block 206 taking the value of the input and the past error into account. In block 208 the ratio of the new input to the previous input is calculated, and in block 210 this ratio is less than 0.1; this indicates that the feed-forward term has ceased to change and has become steady state so the lead term OUT should be made 0, since it should not become negative. In block 212, whatever value the term OUT has become, whether it is equal to the lead term or 0, we add to OUT the value of the lag term. In block 214, the registers used to pass data from one iteration to another are updated. The register PAST DAMP is made equal to the new value of damper position. The register LLAGREG is made equal to the new value of OUT and the register PAST ERROR is made equal to present value IN. The total feed-forward signal is then computed in block 216 and consists of the raw feed forward signal damper position calculated in block 202, plus the output of the lead/lag algorithm calculated in block 212. These two combined form the total feed-forward signal. This is then checked in block 218 against upper and lower constraints to make sure that it lies within the value of 0 to 1 which is the range of the damper position itself. A check is made in block 219 of the value of TEMP, which is a ratio of input to past error determined at bock 208. If the value of TEMP is less than 0.1, it means that the reset register of the controller has to be modified as the lag term begins to decay, since there has been reached a steady state operation, and there is no lead term, only a lag term and the decay of the lag term now should impact immediately on the reset register of the controller to avoid the damper being moved unnecessarily during the decay of the lead/lag algorithm. The feed-forward signal should predominate during the steady state situation. In block 220 this anticipation is calculated, and this block forms a termination of the lead/lag algorithm portion of the total pit pressure controller program. Starting in block 222 with the PI controller, the change in damper position is first made 0, and in block 224 the desired set point of the controller is computed as a function of air flow, since leakage through the recuperator requires raising the set point of the pit pressure to reduce the quantity of leakage. The set point tends to rise with total flow through the recuperator, so this is an adjustment to offset recuperator leakage. After computing the set point of the control loop, in block 226 the error difference between the set point and the actual value of the pit pressure is modified for the actual $\Delta T$ which the program is running under, so the correction for $\Delta T$ is applied to the error.

In FIG. 4B, at block 228 the variable gain is computed as a function of the desired damper position and this variable gain is then multiplied by the fixed gain to provide the total proportional gain for the controller. The final input to the controller in bock 230 is equal to the corrected error from block 226 multiplied by the total gain calculated in block 228. In block 232 it is determined if the controller is on automatic control, and in block 234 it is determined whether the pit cover is on or not. For a pit under control the cover should be on, and if so at block 236. The reset register is updated including the anticipation of the lead/lag decay calculated in block 220. In block 238, the sum of the proportional, reset and feed-forward terms is calculated and this provides the total desired damper position for a particular pit. In block 240, the combined output is then checked against upper and lower limits and constrained to within a range of 0 to 1, which is the full range of damper position. In block 242 if the output has not been constrained, the flow sheet moves forward to the end of the do loop, if the output has been constrained, then in block 244 the reset register must be modified to take account of the constraining. At block 246 the change in damper position between this iteration and the previous iteration is calculated for each pit.

If the controller is on manual at step 232, then in block 248 there is calculated any change due to a change in manual signal which the operator has imposed, such that if the operator has the damper position control on manual and has changed the damper position, it is necessary to take that change into account. In block 250, the controller reset register is adjusted to match the manual signal so that a bumpless transfer can be made when next going back to automatic control. In block 252 the register of the lead/lag algorithm is set to 0 to again provide bumpless transfer from the state the system is in at the moment to switching at a later time from manual to automatic.

If at block 234 the pit cover is off then the pit ought to be shut down, and in block 254 if the cover is off the damper is moved to the 5% open position, since there must be some minimum opening to make sure that the fuel gases can escape from the pit and then proceed to block 250.

The program operation so far described in relation to FIGS. 4A and 4B is repeated three times, once for each pit, and the output at block 256 is the total desired damper position as the sum of all of these different components.

The program shown in FIG. 4C follows block 256 and is the decoupling algorithm. Having established the desired change in damper position for each pit, the decoupling algorithm provides the resolved change in damper position for each pit, taking interactions into account. Block 260 is the start of the decoupling algorithm for each pit. At block 262 the resolved change in damper position TOT is set equal to the sum from j equals 1 to j equals 3 of the product of the change in damper position times the matrix (I, J). In block 264 the magnitude of a hysteresis effect is inserted into the code. If the ratio of the change of damper position to hysteresis at block 266 is less than unity, the hysteresis effect is set to 0 in block 268. This implements the change in damper position that was already calculated. Otherwise the hysteresis effect AA is retained. From the resolved change in damper position, at step 270 the final damper position is calculated in terms of the previous position plus the effect of hysteresis plus the resolved change.

DESCRIPTION OF FEED-FORWARD/LEAD-LAG CONTROL OPERATION

In FIG. 2, a modified feed-forward signal 51 is provided in which the desired damper position is estimated in accordance with the fuel gas demand signal 48 representing the quantity of fuel gas that is being fired. The feed-forward mode is used to adjust each pit damper in accordance with the major changes in fuel gas flow.

Feed-forward involves the anticipation of a change in related parameters, such as fuel and air flow, which will eventually impact the combustion chamber pressure. The pressure is a feedback signal, but air and fuel flow determine a feed-forward signal because they will take place before the change in pressure has occurred. The feed-forward characteristic is a prediction of the damper position corresponding to the new flue gas flow and is affected by the non-linearity of the particular process system characteristics. Non-linearity, while not as marked with an induced draft system as in a natural draft system, is always a factor. The characteristics of the damper position versus flow equation given in (3) below are developed by the regression analysis of fuel flow versus damper position data obtained under steady-state conditions over a wide range of flows. The characterizer 49 is a piece of firmware which contains this equation.

There is included an absolute lead/lag algorithm which operates on the fuel gas demand signal 48 to provide the modified feed-forward signal 51 which ensures that each damper is open more than is needed during transient conditions of the combustion chamber pressure to provide a safety feature that prevents the flue gases from blowing out into the shop generally and creating a dangerous situation for a human operator. This is a different kind of algorithm from that which is commonly used in an ordinary lead/lag context such as that of a compensator on a feedback signal which assumes a sinusoidal and continuous input disturbance. In the case under consideration, the process disturbance is monotonic, not sinusoidal, and the standard Laplace lead/lag function is not suitable for the desired control operation because it decays too quickly when the change ceases. Also, the standard lead/lag algorithm designed for use in the feedback mode reverses in its behavior when a negative rate of change is detected in the signal which it receives. For these reasons it is inappropriate for use in the feed-forward mode where the object is to have a lead/lag contribution which is always positive and decays gracefully once the signal approaches steady state. The present invention addresses these problems by including a feed-forward lead/lag algorithm which features maintenance of the lead component until after the change has ceased, at which point the lag component or decay commences. Another feature is the positive nature of the output under all conditions.

As the fuel flow increases, the modified feed-forward signal 51 operates to achieve the desired position of the damper 16 in anticipation of the increased flow. The lead/lag feature of the modified feed-forward signal 51 operates to make the damper position change such that the change is more than is otherwise necessary, tending to create a negative pressure during the resulting transient condition of operation. Similarly, when the fuel flow drops, the controlled closing movement of the damper 16 will lag behind the fuel, again creating more suction than is really needed during the resulting transient condition of operation. The modified feed-forward signal 51 attempts to establish new system equilibrium with some precision. However, because the equilibrium based on only the modified feed-forward signal 51 is not absolutely precise, the summer 52 adds to it the output 53 of the damper position PI controller 36 which, because it is fed from the pressure transmitter 42 monitoring the internal pit pressure, will integrate out any resultant error that might persist in the latter pressure during the steady-state operation after any transient has died away.

To anticipate the required damper position change corresponding to an increase in the rate of fuel firing, the lead/lag network incorporates a lead/lag algorithm having the basic transfer function as follows:

$$\frac{C(S)}{R(S)} = \left| k \cdot \frac{1 + T_1 S}{1 + T_2 S} \right| \quad (1)$$

where C(S) is the controlled variable and R(S) is the reference variable, $T_1$ is the lead time constant, $T_2$ is the lag time constant and k is the gain.

The value of the modified feed-forward signal 51 is added to the output 53 of the PI Controller 36 in line 158 of the control program listing included in Appendix A. However, in the past, the rapid decay in this value with constant input has caused an unnecessary change in the position of the damper 16 which must be integrated out through the PI algorithm of controller 36, to restore equilibrium. One improvement of the present invention is to correct the reset register of the PI algorithm of controller 36 internally by the amount of the decay in the lead/lag algorithm output immediately as it is calculated, to avoid the controller 36 unnecessarily disturbing the damper.

DESCRIPTION OF VARIABLE GAIN CONTROL OPERATION

For purposes of operating the damper position control system, the desired relationship is the change in damper position for a change of pressure, which relationship cannot be derived directly, so it is derived indirectly from a combination of relationships that can be measured. One of these is the relationship between a change of pressure in the pit and the change of input mass flow for a constant stack draft and fixed damper position. The other relationship is the change in damper position for a change of input mass flow, or the feed-forward characteristic. The product of the transformed partial differentials in each of these relationships determines a third relationship which is the change of pressure to the change of damper position. Because the change of pressure is caused by the change of damper position which, in turn, is caused by a change of pressure, this third relationship becomes the system gain.

The non-linearities in flue gas flow introduced by the resistance of the recuperator or economizer and the reliance on natural draft create the need for the variable gain feature which acts to obtain a constant system gain over the whole range of system operation. Reliance on natural draft introduces non-linearities in the flow because with natural draft, for an increase in the flow of flue gases the draft tends to fall. The draft is a function of the temperature difference between the top and the bottom of the stack and the velocity of the flue gases. The up-draft inherent in a rising column of hot air tends to create a low pressure at the bottom of the stack. The draft or suction at the stack bottom tends to be reduced, for a constant temperature difference, as the velocity of the flue gas flowing into the bottom of the stack increases so as to increase the pressure at the bottom. With natural draft, the suction tends to decrease with increased flue gas flow, as compared with an induced draft fan application, where the suction tends to increase with increased flue gas flow as the fan speeds up to force the increase in suction.

Application of control theory stability criteria dictates that the system gain, which is the product of the disturbance gain and the controller gain, should be unity or less. The partial differential derived from the damper pressure relationship, or dD/dP, is the variable gain of the damper position controller. When the combined damper position controller gain is multiplied by the predicted process response as reflected by the partial differential dP/dD, the overall system gain should be less than unity. Thus, $$[\text{controller gain}] \cdot [\text{process gain}] = \quad (2)$$

$$\left[ \left( \frac{dD}{dP} \cdot k_o \right) \left( 1 + \frac{1}{T(s)} \right) \right] \times \left[ \frac{dP}{dD} \right] \leq 1$$

where $$\left( 1 + \frac{1}{T(s)} \right)$$

is the Laplace transfer function 47 for a PI controller, $$\left( \frac{dD}{dP} \cdot k_o \right)$$

is the consolidated proportional gain 46, and $k_o$ is the root proportional gain 37.

Because the root proportional gain of the damper position controller is a value which can be set externally, the overall system gain can be determined. In the present invention there is a variable gain which is a function of the actual damper position. The more open the damper becomes, the larger the controller gain becomes because the change of damper position for a given change of pressure has to become greater. This is because the stack draft is decreasing with increased flue gas flow, and a greater change in damper opening is therefore required. As the flow increases, the damper must be moved more to get the same change of pressure in the pit.

Analysis of the flow relationships on an empirical or theoretical basis reveals that the gain on the system has a very non-linear characteristic. The method of theoretical analysis is now described.

The herein disclosed theoretical plant model was exercised in the control program listing of Appendix A, eliminating the effect of flow differences on pit pressure and, assuming a constant value for stack draft ($-1.1688$ inches $H_2O$) and pit pressure ($-0.1$ inches $H_2O$), i.e., establishing an equality between input mass flow and flue gas flow. The flue gas flow W through the recuperator/damper/stack system was thus established over the range of damper position D of 10% through 100% and the flow/damper position relationship is plotted in curve 96 in FIG. 5. The curve relates the independent variable, flue gas flow (or mass flow in lb./hr.), to damper position. Regression of the data from which this curve was plotted gives the equation:

$$D = 0.17742E - 03W - 0.74227E - 7W^2 + 0.14334E - 10W^3 \tag{3}$$

The flue gas flow equation was also regressed from this curve, and indicates that gas flow is a function of the damper position. Thus, $$W = -30.66 + 1.4249E + 04D - 1.39074E + 04D^2 + 4932D^3 \tag{4}$$

Thus, the partial differential of this relationship is:

$$\frac{\Delta W}{\Delta D} = 1.4249E + 04 - 2(1.39074E + 04D) + 3(4932.0D^2) \tag{5}$$

Figure 5:
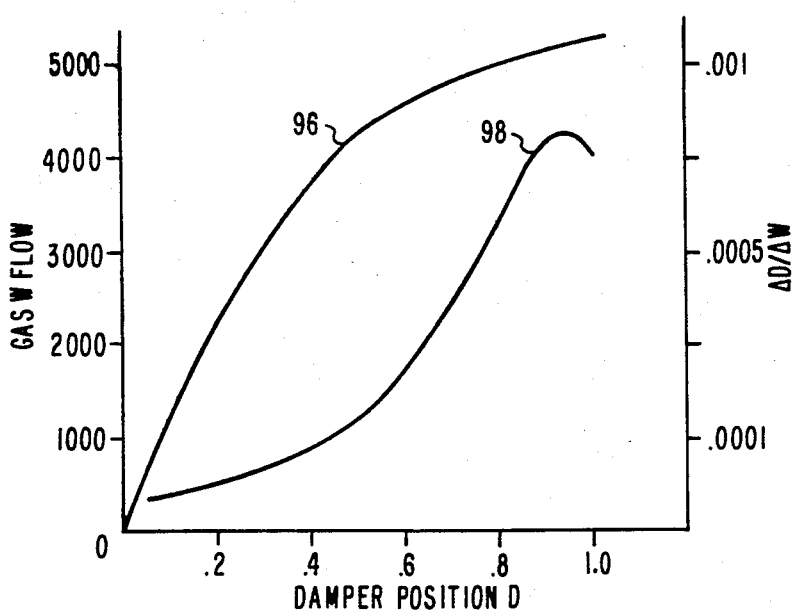
In FIG. 5, the upper curve shows the flue gas flow as a function of damper position and the lower curve shows the partial differential of this relationship; and In FIG. 6 the upper curve shows a plot of the partial differential of flue gas flow with respect to pit pressure, and the lower curve shows the change in damper position corresponding to the flow produced by a change in pit pressure.

Curve 98 in FIG. 5 plots the inverse of this relationship, $\Delta D/\Delta W$, and indicates by how much the flow into the pit should change to correspond to a change in damper position.

Figure 6:
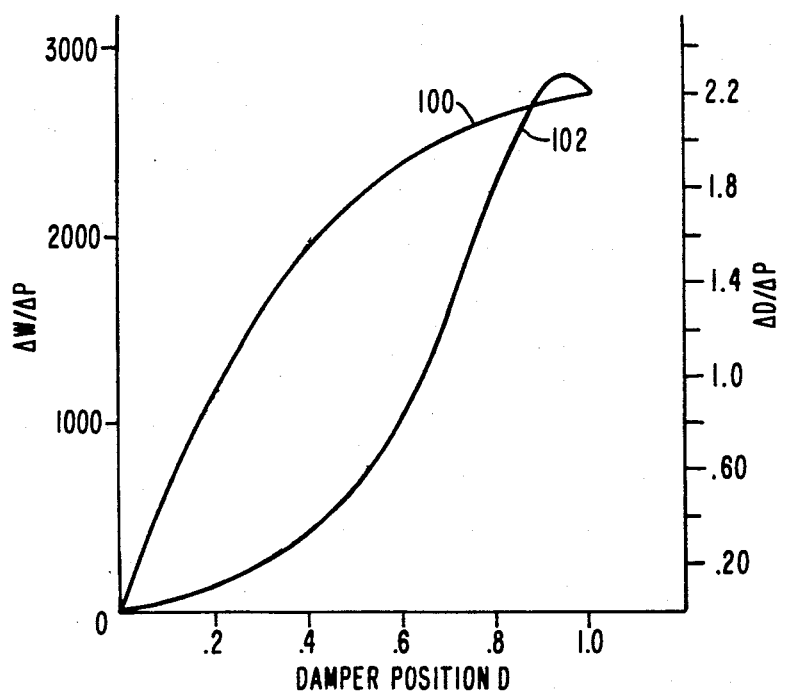

For varying damper positions over the range 10% to 100%, the flows with pit pressures of $-0.1$ inches $H_2O$ and zero inches $H_2O$ respectively were established and the partial differential of flue gas flow with respect to pit pressure, $\Delta W/\Delta P$, is plotted in curve 100 of FIG. 6 and defined by the flow/pressure relationship:

$$\frac{\Delta W}{\Delta P} = -23.82 + 7265.6D - 6785.2D^2 + 2294.9D^3 \tag{6}$$

For purposes of establishing a soaking pit combustion pressure control system, a key part in the analysis of soaking pit operation is the establishment of the damper/pressure relationship. The forward gain associated with the tuning of a PI controller may be defined as the change in damper position corresponding to the flow produced by a change in pit pressure. This is obtained by taking the two partial differentials, both in terms of damper position D, and dividing them. Thus, the damper/pressure relationship is:

$$\frac{\Delta W}{\Delta P} \bigg/ \frac{\Delta W}{\Delta D} = \frac{\Delta W}{\Delta P} \cdot \frac{\Delta D}{\Delta W} = \frac{\Delta D}{\Delta P} \tag{7}$$

Curve 102 in FIG. 6 is the damper/pressure relationship, or change of damper position for a change of pressure. The primary stimulus in the system is a change of pit pressure, or furnace pressure, which through the controller produces a change in damper position.

By evaluating the rather complicated expression of equation 7 for various values of D and plotting the results, curve 102 in FIG. 6 can be obtained. By regressing this curve, the variable gain is found:

$$\frac{\Delta D}{\Delta P} = -2.74228E - 02 + 0.161417D + 2.3433D^2 \tag{8}$$

Clearly, this must be constrained to some low value greater than zero if the controller is to continue to function. It must also never reverse in sign.

In order to incorporate the adjustable tuning constant $k_o$ in previous equation (2), the above expression must be modified as follows to establish the consolidated proportional gain:

$$\text{GAIN} = [-2.74228E - 02 + .161417D + 2.3433D^2] \cdot k_o \tag{9}$$

The purpose of the foregoing analysis is to identify that in a non-linear system, the damper/pressure relationship can be developed as shown in equation 7. This relationship is strikingly non-linear and it is clear that a variable gain control 54 would be desirable, the gain being varied as a function of damper position.

DESCRIPTION OF COMPENSATION CONTROL OPERATION FOR ITERATION INTERVAL VARIATIONS

The damper position PI controller is implemented in a programmed microprocessor. With a fixed iteration interval, the reset time constant can be adjusted to achieve system stability. However, because the microprocessor duty cycle may change, the actual iteration interval ($\Delta t$) may be subjected to unwanted changes. The PI controller will not exhibit the right behavior unless such changes in the actual $\Delta t$ are compared to the reference $\Delta t$ and a compensating adjustment is made by modifying the basic Laplace transfer function for the overall controller gain. In the herein disclosed PI controller, with a base or reference iteration interval of a quarter of a second, for example, if the actual iteration interval slips to one second, the gain will be decreased in a compensating fashion by $\Delta t$ compensator 43 to maintain former system stability.

The stack damper simulation as incorporated in the control program listing of Appendix A was exercised with a proportional only controller, the reset time constant being set to 10000. The gain on the control loop was then increased in steps until the loop became unstable. The associated gain and loop natural frequency S were then noted as 2.09 and 2.5 sec. respectively.

A common rule of thumb (see Rutherford, C. I., The Practical Application of Frequency Response Analysis to Automatic Process Control, Proc. Inst. Mech. Eng., Vol. 162, No. 3, pp 334–343, 1950) is to divide the gain (G) that produces instability by $\sqrt{e}$ to obtain $k_o$, the gain for a damped oscillation thus:

$$k_o = G/\sqrt{e} \tag{10}$$

The reset time constant may be established by assuming that the controller is to have a 9° phase lag $\phi$. The reset time constant T can be computed from the relationship:

$$\frac{T}{S} = 2\pi \tan \phi \tag{11}$$

For $\phi = 9°$, $T/S = 0.995$ or close to unity. The above rule of thumb was evolved in the course of the tuning of analog control systems in which the iteration interval $\Delta t$ approaches zero. Where $\Delta t$ has a finite value which is large compared to the time constant of the plant, it has become apparent that the effective gain of the system is proportional to the value of $\Delta t$. This is not unexpected in a sampled data system in which the change in pressure is proportional to the product of time and the difference between pit inlet and outlet flows.

A common DDC algorithm for a PI controller having the transfer function:

$$\frac{C(S)}{R(S)} = k_o \left[ 1 + \frac{1}{T(S)} \right] \tag{12}$$

can be expressed in this case in its sample data form as:

$$\frac{C(S)}{R(S)} = k_o \left[ 1 + \frac{\Delta t}{T} \right] \tag{13}$$

The normal transfer function for a PI controller can be applied to express the change in damper position for a given change of pressure coming into the controller. Thus, $$\frac{\Delta D}{\Delta P} = k_o \left[ 1 + \frac{\Delta t}{T} \right] \tag{14}$$

The iteration interval is represented by $\Delta t$ which corresponds to the sampling time. Use of a reference $\Delta t$ of a quarter of a second or less allows the sample data algorithm to approximate the theoretical relationships. If the reference iteration interval is chosen to be 0.25 seconds for a specific process control application, and the gain and reset time constants are established accordingly, then for uniform dynamic behavior of the control loop regardless of the value of the actual iteration interval $\Delta t$, (14) should be modified as follows:

$$\frac{\Delta D}{\Delta P} = \frac{0.25}{\Delta t} \left[ k_o \left[ 1 + \frac{\Delta t}{T} \right] \right] \tag{15}$$

or $$\Delta D = \frac{\Delta P * 0.25}{\Delta t} \left[ k_o \left[ 1 + \frac{\Delta t}{T} \right] \right] \tag{16}$$

In this way the control loop settings can be established in a rational manner and automatically compensated for variations in the actual controller execution interval. As the rationale for this innovation the following explanation is offered. Equation (15) can be rewritten in the form:

$$\frac{\Delta D}{\Delta P} = \Delta t_{REF} \left[ \frac{k_o}{\Delta t} \left[ 1 + \frac{\Delta t}{T} \right] \right] \tag{17}$$

In a system containing a first order process lag, a given difference in flow rates will produce a response in the form of a pressure change which is directly proportional to the time of duration. Thus by adjusting $k_o$, the experimentally determined root proportional gain or tuning constant, by the ratio $\Delta t_{REF}/\Delta t$, the effect on system gain remains constant regardless of the value of $\Delta t$.

The ability to automatically modify $k_o$ is important in systems where the value of $\Delta t$ cannot be assured, such as where a microprocessor with a high duty cycle might slip. If, in the course of slipping, the same dynamic behavior is maintained, the stability of the control is improved regardless of changes in the iteration interval.

DESCRIPTION OF DECOUPLING CONTROL OPERATION

Each damper position control system is operationally independent until the desired change in damper position is generated. Before that change is implemented, the desired change in the other two damper positions is calculated. Having established by how much each damper position should change in order to maintain its own pit pressure, the effect on the other pits is evaluated. The coupling here is different from pit to pit because of the way in which the flue gas ducts are connected and the pressure drops existing therein. A net change is generated through a simultaneous equation, and the resolved desired change is added simultaneously to the present position on each pit damper. Otherwise, if these changes are made one at a time, they will react undesirably with each other by disturbing each other's pit pressure controller unnecessarily. By anticipating the undesired interactions and implementing the resolved desired changes all at once, such interactions are minimized. The algorithms used for the control of each damper position are exercised once per second.

The diagram of FIG. 2 shows a decoupling control 56 incorporating a decoupling algorithm. Whenever the damper on any one pit opens, the volume of gas leaving that pit will increase, as will the stack flow loss however. The associated reduction in net stack draft will also affect the flows from the other pits and cause their dampers to tend to open slightly in response; but with some lag, which can cause inter-loop instability if the interaction is sufficiently large. To avoid this occurring the following decoupling algorithm is used, which takes the estimated damper position change associated with each pit, resolves these, and passes back a resolved change to each damper position servo motor. The decoupling algorithm looks at the effect that any individual desired damper position change will have on the other pit dampers. Once these are resolved, it is the resolved changes that are actually used to shift the damper positions.

The decoupling algorithm shown in lines 181-191 of Appendix A is organized so that the desired change in damper position $\Delta D_i$ for each of the 3 loops is first calculated. Knowing the interaction factor between each pit, the coupled changes in damper position $\Delta D_i^*$ may be calculated as follows:

$$\Delta D_1^* = k_{11}\Delta D_1 + k_{12}\Delta D_2 + k_{13}\Delta D_3 \tag{18}$$

$$\Delta D_2^* = k_{21}\Delta D_1 + k_{22}\Delta D_2 + k_{23}\Delta D_3$$

$$\Delta D_3^* = k_{31}\Delta D_1 + k_{32}\Delta D_2 + k_{33}\Delta D_3$$

It should be noted that $k_{11}$, $K_{22}$, and $k_{33}$ are all unity. The resultant change in damper position, array V, can be calculated as follows:

$$V_i = V_{i-1} + \Delta D_i^* \tag{19}$$

And the reset registers R can be readjusted so as to be equal to:

$$R_i = V_i - GAIN_i \cdot ERR_i \tag{20}$$

It is seen that the code multiplying a 3×3 matrix by an array is very short and should have little impact on microprocessor duty cycle. The decoupling effect can be eliminated by making matrix MATR in line 187 an identity matrix.

Some pit dampers are very large and the servo mechanism and linkage combined can exhibit hysteresis to small signal changes. To offset this, a small hysteresis factor HYST has been introduced in line 188 which, added to the desired position in line 191, can ensure that this hysteresis is offset.

The velocity algorithm has been used to permit the decoupling feature to be included. It has however been coded in lines 133-146 as an absolute position algorithm, the output from which is then subtracted from the previously calculated output to provide the new desired change in damper position. Note that all control loops must be calculated before the decoupling algorithm is applied.

DESCRIPTION OF PLANT MODEL

The plant model of the flue gas path including the pit chamber 10, the recuperator 14, the damper 16 and the common stack 18 as shown in FIG. 2 may be defined mathematically as shown in the program listing in Appendix A and as follows, in terms of the driving force for the system, i.e., pressure. Each of the model constants is then evaluated based on stated assumptions.

For the purpose of control system simulation, it will be assumed that the pit 10 is provided with a leak-free cover.

LET
$W_I$ = flow of gases into pit lb/hr
$W_o$ = flow of gases leaving pit lb/hr
$V$ = pit volume ft$^3$
$\Delta t$ = interval between iterations secs.
$\Delta P$ = change in pressure over time interval
THEN
$$\Delta P_1 = k_1 \cdot \Delta t \cdot (W_I - W_o) \tag{21}$$

-continued

Assuming:
Volume of pit = 3906 cu. ft.
Pit gas temperature = 2552° F.
Density of air at S.T.P. = 0.0764 lb/ft$^3$
Then, mass of air in pit =

$$\left[\frac{60 + 460}{2552 + 460}\right] \cdot 0.0764 \cdot 3906 = 51.52 \text{ lb} \tag{22}$$

For a 1/3600 lb per second change in mass of air in the pit, the change in pit pressure=

$$\left[\frac{55.52 + 1/3600}{55.52} - 1\right] \cdot 14.7 = 0.0000793 \text{ psi} \tag{23}$$

Therefore, $$\Delta P_1 = 0.0000793 \cdot \frac{33.9 \cdot 12}{14.695} = 0.002194 \tag{24}$$

ins H$_2$O/lb per hr per sec

The pressure drop across the recuperator 14 varies directly as the flow through it, thus:

$$\Delta P_2 = k_2 \cdot W_o^2 \tag{25}$$

Assume that the pressure drop across the recuperator is 0.627 ins. H$_2$O with a mass gas flow of 5000 lb/hr.

$$\text{THEN from } (24) k_2 = 0.627/5000^2 = 2.508 \cdot 10^{-8} \tag{26}$$

For a damper position D, and assuming a constant discharge characteristic, the flow may be calculated from:

$$W_o = k_3 D \sqrt{\Delta P_3} \tag{27}$$

or $$\Delta P_3 = \left[\frac{W_o}{k_3 D}\right]^2 \tag{28}$$

It should be noted that, in order to avoid dividing by zero, the stack draft in the model should have a minimum value of, say 1%. Also that, within the overall model, $\Delta P_3$ cannot fall below the stack draft.

Assume that the pressure drop across the damper is 0.23577 ins H$_2$O with the damper 80% open and passing a mass gas flow of 5000 lb/hr.

Then, from (28):

$$k_3 = \frac{W_o}{D \sqrt{\Delta P_3}} = \frac{5000}{0.8 \cdot \sqrt{0.23577}} = 12871.7 \tag{29}$$

In accordance with Perry, R. H., Chemical Engineer Handbook, McGraw Hill 1963, pp 9-43, the theoretical stack draft may be derived as follows, where:

$H$ = stack height ft
$P$ = barometric pressure ins. Hg
$T$ = ambient temperature °R
$T_1$ = average stack temperature °R
$S$ = stack draft at base of stack ins. H$_2$O
THEN -continued $$S = 0.256 \cdot H \cdot P \cdot \left[ \frac{1}{T} - \frac{1}{T_1} \right] \quad (30)$$

Assuming that the stack height is 125 feet, the barometric pressure is 29.5 ins. Hg, ambient temperature of 60° F. and a mean stack temperature of 1000° F., Then from (30):

$$S = -0.256 \cdot 125 \cdot 29.5 \cdot \left[ \frac{1}{520} - \frac{1}{1460} \right] = -1.1688 \text{ ins } H_2O \quad (31)$$

Again, in accordance with Perry, R. H., Chemical Engineer Handbook, McGraw Hill 1963, pp 9–43, stack flow loss may be estimated from the following, where:

$\phi$ = stack diameter ft.
$\Delta P_5$ = stack flow loss ins. $H_2O$
THEN $$\Delta P_5 = 0.0942 \cdot \left[ \frac{T_1}{\phi^4} \right] \cdot \left[ \frac{W_{01} + W_{02} + W_{03}}{100000} \right]^2 \cdot \left[ 1 + \frac{.025 \cdot H}{\phi} \right] \quad (32)$$

therefore, $$\Delta P_5 = k_5 [W_{01} + W_{02} + W_{03}]^2 \quad (33)$$

Assume a stack diameter of 6.83 ft., Then from (33):

$$\Delta P_5 = 0.0942 \cdot \left[ \frac{1460}{6.83^4} \right] \cdot \left[ \frac{W_{TOT}}{100000} \right]^2 \cdot \left[ 1 + \frac{.025 \cdot 125}{6.83} \right] \quad (34)$$

Therefore, $$\Delta P_5 = k_5 W_{TOT}^2 \quad (35)$$

and $$k_5 = 9.2117E - 12 \quad (36)$$

To determine the flue gas flow as a function of damper position, a pressure balance within the system shown in FIG. 1 may be defined for pit A as follows:

LET $P$ = pressure in pit, ins $H_2O$ $$W_{023} = W_{02} + W_{03} \quad (37)$$

$$P = S + \Delta P_2 + \Delta P_3 + \Delta P_5 - \Delta P_1 \quad (38)$$

Substituting the appropriate equivalents gives $$(S - P) + k_2 W_o^2 + \left[ \frac{W_o}{k_3 D} \right]^2 + \quad (39)$$

$$k_5 \cdot [W_o + W_{023}]^2 - k_1 \Delta t \cdot [W_I - W_o] = 0$$

Therefore, $$\left[ k_2 + \frac{1}{k_3 D} + k_5 \right] \cdot W_o^2 + [2 k_5 W_{023} + k_1 \Delta t] \cdot W_o + \quad (40)$$

$$[S - P - k_1 \Delta t W_I + k_5 W_{023}^2] = 0$$

Which, being a standard, quadratic equation, can be solved in the usual way for the flow $W_o$ through pit A. A similar procedure will apply to the flow through pits B and C.

In Appendix B there is included a control program listing to control a plurality of soaking pits, such as shown in FIGS. 2 and 3.

In Appendices A and B there are included control program listings relating to the herein disclosed control of a non-linear combustion process. The control program listing is written in the Fortran language which is available for use with a variety of microprocessors. Many of these microprocessors have already been supplied to customers, including technical instruction manuals and descriptive documentation to explain to persons skilled in this art the operation of the microprocessor apparatus. This control program listing is included to provide an illustration of one suitable embodiment of the present invention that has been developed. This control program listing at the present time is more or less a development program and has not been extensively debugged through the course of practical operation for the real time control of the above operation. It is well known by persons skilled in this art that most real time control application programs contain some bugs or minor errors, and it usually takes varying periods of actual operation time to identify and routinely correct the more critical of these bugs.

```
0001:  0000   C      STACK DAMPER SIMULATION
0002:         C
0003:         C
0004:                REAL PSTERR(3),FFWX(3),DTEM(3,5)
0005:                REAL DELDAMP(3),MATR(3,3),LLAGGN,LLAGTM1,LLAGTM2,IN,FFWD
0006:                REAL SETPNT(3),DAMPOSN(3),FLOWIN(3),FLOWOUT(3),RESET(3)
0007:                REAL GAIN(3),RESTM(3),D(3),PPIT(3),FDUM(3),HYST(3)
0008:                REAL ITAE(3),FACT(3),LLAGOUT,LLAGAIN,LDLGCOEF(5),LDLGLMT(2)
0009:                REAL HAND(3),LLAGTIM(3),LLAGREG(3),PASTDMP(3),GSDMNO(3),GSCORAT(3)
0010:                INTEGER ISP(6),MANUAL(3)
0011:                LOGICAL COVER(3),LMODL
0012:                EQUIVALENCE (D(1),ISP(1))
0013:                COMMON/FCOM/FLOWOUT,FLOWIN,DAMPOSN,PPIT,PIT,RECUP,DAMP,STACK,
0014:               1STDRFT,DELTEF
0015:                DATA ISP/$0000,$0000,$A0A0,$0000,$A0A0,$A0A0/
0016:                DATA HYST/0.005,0.005,0.005/
0017:                DATA LP/21/
0018:                DATA MATR/1.,.05,.05,.05,1.,.05,.05,.05,1./
0019:         C
0020:         C      LEAD/LAG ALGORITHM INITIALIZATION
0021:         C
0022:                DELTEE=1.00
```

```
0023: 0002         LMODL=.FALSE.
0024:              LDLGLMT(1)=0.0
0025:              LDLGLMT(2)=1.0
0026:              LLAGTM1=1.5
0027:              LLAGTM2=2.0
0028:              LLAGGN=3.0
0029:              LDLGCOEF(1)=LLAGGN*(2.*LLAGTM1+DELTEE)/(2.*LLAGTM2+DELTEE)
0030:              LDLGCOEF(2)=LLAGGN*(DELTEE-2.*LLAGTM1)/(2.*LLAGTM2+DELTEE)
0031:              LDLGCOEF(3)=(2.*LLAGTM2-DELTEE)/(2.*LLAGTM2+DELTEE)
0032:        C
0033:        C     DYNAMIC AND STATE CONSTANTS
0034:        C
0035:              PIT=.00219
0036:              RECUP=2.51E-08
0037:              DAMP=12871.7
0038:              STACK=9.2117E-12
0039:        C
0040:        C     SET UP CONTROLLER CONSTANTS AND INITIALIZE
0041:        C
0042:              FFLOW=5000.
0043:              DAMPOSN(1)=0.7837
0044:              DAMPOSN(2)=0.8232
0045:              DAMPOSN(3)=0.8828
0046:              DO 1 I=1,3
0047: 006A         SETPNT(I)=+0.1
0048:              MANUAL(I)=1
0049:              RESET(I)=0.0
0050:              FLOWIN(I)=5000.
0051:              FLOWOUT(I)=FLOWIN(I)
0052:              GAIN(I)=0.867
0053:              RESTM(I)=2.5
0054:              HAND(I)=0.8
0055:              GSCORAT(I)=6.25
0056:              GSDMND(I)=FLOWIN(I)/GSCORAT(I)
0057:              PASTDMP(I)=DAMPOSN(I)
0058:              COVER(I)=.TRUE.
0059: 00EE       1 CONTINUE
0060:        C
0061:        C     INITIALIZE MODEL
0062:        C
0063: 00F4         N=0
0064:              NMAX=110
0065:              STDRFT=-1.1698
0066:              REF=FLOWIN(2)
0067:              REFG=GSDMND(2)
0068:              FTOT=FLOWOUT(1)+FLOWOUT(2)+FLOWOUT(3)
0069:              DSTACK=STACK*FTOT**2
0070:              DO 12 I=1,3
0071: 0118         CALL FLOW(I,FLOWOUT)
0072:              DRECUP=RECUP*FLOWOUT(I)**2
0073:              DDAMP= (FLOWOUT(I)/(DAMP*DAMPOSN(I)))**2
0074: 014E      12 PPIT(I)=STDRFT +DRECUP+DDAMP+DSTACK
0075:        C
0076:        C     BEGINNING OF DYNAMIC SIMULATION MODEL
0077:        C
0078: 0163       2 N=N+1
0079:              IF(N.GT.NMAX) GO TO 1000
0080: 016A         WRITE(LP,7)
0081: 016D   C
0082:        C     CALCULATE STATES FOR EACH PIT; PROVIDE FLOWIN RAMPING WHERE NECESSARY
0083:        C     AND ADD NOTSE TO INPUT FLOW
0084:        C
0085: 016E         DO 3 I=1,3
0086: 0170         CALL RAND(Y)
0087:              IF(N.LT.10.OR.I.NE.2) GO TO 16
0088: 0184         IF(N.GT.60) GO TO 63
0089: 018A         GSDMND(2)=GSDMND(2)-REFG/16.0
0090:              IF(GSDMND(2).GT.0.0) GO TO 64
0091: 019C         FLOWIN(2)=0.0
0092:              GSDMND(2)=0.0
0093:              GO TO 17
0094: 01A5      63 GSDMND(2)=GSDMND(2)+REFG/16.0
0095:              IF(GSDMND(2).GT.REFG) GSDMND(2)=REFG
0096: 01B8         IF(N.LT.62) GO TO 17
0097: 01C0      64 FLOWIN(2)=GSDMND(2)*GSCORAT(2)+10.*Y
0098:              GO TO 17
0099: 01E2      16 FLOWIN(I)=5000.+10.*Y
0100: 01E1      17 CONTINUE
0101:              FLOWIN(I)=FLOWIN(I)- 10.*PPIT(I)
0102:              FTOT=0.0
0103:              DO 15 J=1,I
0104: 0204      15 FTOT=FTOT+FLOWOUT(J)
0105: 021A         DSTACK=STACK*FTOT**2
0106:              DRECUP=RECUP*FLOWOUT(I)**2
```

```
0107:           DDAMP=(FLOWOUT(I)/(DAMP*DAMPOSN(I)))**2
0108:           DPIT=PIT*(FLOWOUT(I)-FLOWIN(I))*DELTEE
0109:           PPIT(I)=PPIT(I)-DPIT
0110:           SMAX=STDRFT+DSTACK
0111:           IF(PPIT(I).LT.SMAX) PPIT(I)=SMAX
0112: 027C   C
0113:        C  LEAD/LAG ALGORITHM
0114:        C
0115: 0286     FLEW=GSCORAT(I)*GSDMND(I)
0116:          DMPN=.14169E-03*FLEW-.45755E-07*FLEW**2+.73745E-11*FLEW**3
0117:        C
0118:          IN=ABS(DMPN-PASTDMP(I))
0119:          OUT=LDLGCOEF(1)*IN+LDLGCOEF(2)*PSTERR(I)
0120:          TEMP=ABS(IN/PSTERR(I))
0121:          IF(TEMP.LT.0.100) OUT=0.0
0122: 02E6     OUT=OUT+LDLGCOEF(3)*LLAGREG(I)
0123:          PASTDMP(I)=DMPN
0124:          LLAGREG(I)=OUT
0125:          PSTERR(I)=IN
0126:          FFWD=DMPN+OUT
0127:          IF(FFWD.LT.LDLGLMT(1)) FFWD=LDLGLMT(1)
0128: 0324     IF(FFWD.GT.LDLGLMT(2)) FFWD=LDLGLMT(2)
0129: 032E     IF(TEMP.LT.0.100) DELRESET=0.0
0130: 0338     IF(DELRESET.EQ.0.0) GO TO 10
0131: 0340     DELRESET=(1.-LDLGCOEF(3))*LLAGREG(I)
0132: 0340  10 FFWX(I)=FFWD
0133:        C
0134:        C  CONTROLLER - VELOCITY ALGORITHM
0135:        C
0136:          DELDAMP(I)=0.0
0137:          SETPT =SETPNT(I)+ACONST*TOTAIR
0138:          ERR=(PPIT(I)-SETPT)/(4.*DELTEE)
0139:          DD=DMPN
0140:          GAINT=GAIN(I)*(-0.01855+0.16085*DD+1.527*DD**2)/1.5262
0141:          FACT(I)=GAINT*ERR
0142:          IF(MANUAL(I).EQ.0) GO TO 67
0143: 03B0     IF(COVER(I)) GO TO 66
0144: 03C4     DELDAMP(I)=0.05-DAMPOSN(I)
0145:          DAMPOSN(I)=0.05
0146:          GO TO 65
0147: 03DE   C
0148:        C  MANUAL TRACKING MODE
0149:        C
0150: 03E0  67 DELDAMP(I)=HAND(I)-DAMPOSN(I)
0151:          DAMPOSN(I)=HAND(I)
0152: 0401  65 RESET(I)=DAMPOSN(I)-FACT(I)
0153:          LLAGREG(I)=0.0
0154:          GO TO 6
0155: 0427  66 CONTINUE
0156:        C
0157:        C  PROPORTIONAL PLUS RESET CONTROLLER ALGORITHM
0158:        C
0159:          RESET(I)=RESET(I)+ERR*DELTEE/RESTM(I)+DELRESET
0160:          TEMP=RESET(I)+FFWD+FACT(I)
0161:          TEMP1=TEMP
0162:          IF(TEMP.GT.1.0) TEMP=1.0
0163: 0450     IF(TEMP.LT.0.01) TEMP=0.01
0164: 0467     IF(TEMP.EQ.TEMP1) GO TO 5
0165: 046F     RESET(I)=TEMP-FFWD-FACT(I)
0166: 0487   5 DELDAMP(I)=TEMP-DAMPOSN(I)
0167:          IF(I.NE.2) GO TO 6
0168: 049C     WRITE(LP,44) FACT(I),RESET(I),FFWD,OUT,TEMP,DAMPOSN(I)
0169: 0487   6 CONTINUE
0170:        C
0171:          ERR2=PPIT(I)-SETPT
0172:          IF(N.GT.10) ITAE(I)=ITAE(I)+DELTEE*FLOAT(N-10)*ABS(ERR2)
0173: 04C7   C
0174: 04E8     DTEM(I,1)=DPIT
0175:          DTEM(I,2)=DRECUP
0176:          DTEM(I,3)=DDAMP
0177:          DTEM(I,4)=DSTACK
0178:          DTEM(I,5)=ERR
0179: 051B   3 CONTINUE
0180: 0521  44 FORMAT(1H ,3F10.4,5X,3F10.4)
0181:        C
0182:        C  DECOUPLING ALGORITHM
0183:        C
0184:          DO 20 I=1,3
0185: 0523     TOT=0.0
0186:          DO 21 J=1,3
0187: 052B  21 TOT=TOT+DELDAMP(J)*MATR(I,J)
0188: 0548     AA=HYST(I)
0189:          IF(TOT.LT.0.0) AA=-AA
```

```
0190: 055C        IF((TOT/AA).LT.1.0) AA=0.0
0191: 0568        DAMPOSN(I)=DAMPOSN(I)+TOT+AA
0192:       C
0193:       C     LIST OUTPUT
0194:       C
0195:             J1=4-I
0196:             E=O(I)
0197:             E1=O(J1)
0198:             WRITE(LP,4) N,I,FLOWIN(I),FLOWOUT(I),(DTEM(I,K),K=1,4),E,PPIT(I),
0199: 0593       1DAMPOSN(I),E1,DTEM(I,5),RESET(I)
0200: 05DA     20 CONTINUE
0201:       C
0202:       C     CALCULATE NEW FLOW OUT FROM PIT
0203:       C
0204: 05E0        DO 13 I=1,3
0205: 05E2     13 CALL FLOW(I,FDUM)
0206: 05E9        DO 14 I=1,3
0207: 05EB     14 FLOWOUT(I)=FDUM(I)
0208:       C
0209: 05FE        GO TO 2
0210: 0600   1000 CONTINUE
0211:             N=N-1
0212:             DO 51 I=1,3
0213: 0604     51 ITAE(I)=ITAE(I)*DELTEE
0214: 0621-       WRITE(LP,30) ITAE,N
0215: 0628        CALL EXIT
0216: 062C      4 FORMAT(1H ,2T4,2F8.0,4F8.4,A4,2F8.4,A4,2F8.4)
0217:           7 FORMAT(1H ,120X,1H*)
0218:          30 FORMAT(1H0,9H ITAE  = ,3F20.4,I5)
0219:             END

PGM SIZE: 1587  POOL SIZE:  0426  ERRORS: 0000  VERSION:  12  BINARY RECS:  0056

0001: 0000        SUBROUTINE FLOW(I,FLOWOUT)
0002:             REAL FLOWOUT(3),FLOWIN(3),DAMPOSN(3),PPIT(3),FDUM(3)
0003:             COMMON/FCOM/FDUM,   FLOWIN,DAMPOSN,PPIT,PIT,RECUP,DAMP,STACK,
0004:            1STDRFT,DELTEF
0005:             FTOTSUB=0.0
0006: 0005        DO 1 J=1,2
0007: 0008        J1=I+J
0008:             IF(J1.GT.3) J1=J1-3
0009: 0014      1 FTOTSUB=FTOTSUB+FLOWOUT(J1)
0010: 0024        A=RECUP+1./(DAMP*DAMPOSN(I))**2+STACK
0011:             B=2.*STACK*FTOTSUB+PIT*DELTEE
0012:             C=STDRFT-PPIT(I)-PIT*DELTEE*FLOWIN(I)+STACK*FTOTSUB**2
0013:             TEMP=B**2-4.*A*C
0014:             IF(TEMP.GT.0.0) GO TO 2
0015: 0089        TEMP=0.0
0016:             WRITE(21,3)
0017: 0091      3 FORMAT(1H ,35HWARNING SQUARE ROOT NEGATIVE NUMBER)
0018:           2 TEMP=SQRT(TEMP)
0019:             FLOWOUT(I)=(-B+TEMP)/(2.*A)
0020:             RETURN
0021: 00AD        END

PGM SIZE: 0179  POOL SIZE:  0072  ERRORS: 0000  VERSION:  12  BINARY RECS:  0008

M//FORTRAN
10:44:03

M//FORTRAN
10:44:07

0001: 0000   C  RANDOM NUMBER GENERATOR SUBROUTINE                              RAND0100
0002:              SUBROUTINE RAND(YFL)                                         RAND0110
0003:              DATA MP,MSK,4/3,37FFF,4579/                                  RAND0120
0004:              DATA ACON,BCON/65536.,2147483647./                           RAND0130
0005:              IF(YFL.NE.0.) GO TO 1                                        RAND0140
0006: 0008    S    LDA    M                                                     RAND0150
0007: 000C    S    STA    IA                                                    RAND0160
0008: 000D   S1    LDA    IA                                                    RAND0170
0009: 000E    S    STZ    4                                                     RAND0180
0010: 000F    S    MPY    MP                                                    RAND0190
0011: 0010    S    STA    IB                                                    RAND0200
0012: 0011    S    LDA    IA                                                    RAND0210
0013: 0012    S    ADD    4                                                     RAND0220
0014: 0013    S    NJP    )2                                                    RAND0230
0015: 0014    S    JMP    )3                                                    RAND0240
0016: 0015   S2    INC    IB                                                    RAND0250
0017: 0016    S    AND    MSK                                                   RAND0260
0018: 0017   S3    STA    IE                                                    RAND0270
0019: 0018    S    LDA    IB                                                    RAND0280
0020: 0019    S    STA    IA                                                    RAND0290
0021: 001A        YF1=FLOAT(IA)                                                 RAND0300
```

```
0022;              IF(YF1.LT.0.) YF1=ACON+YF1                          RAND0310
0023; 0026         YF2=FLOAT(TE)*ACON                                  RAND0320
0024;              YFL=(YF1+YF2)/BCON                                  RAND0330
0025;              RETURN                                              RAND0340
0026; 0038         END                                                 RAND0350

PGM SIZE: 0063   POOL SIZE:  0022   ERRORS: 0000   VERSION:  12   BINARY RECS:  0003

M//ASSIGN B1=12
M//REWIND B1
M//LINK
 10:44:09
 LINK LOADER VERSION X7
XM
 ORIGIN= 85A0
LC,LD
 AREA USED 85A0--8DA0
 SYMBOL= FLOW
 AREA USED 8DA1--8E98
LD
 SYMBOL= RAND
 AREA USED 8E9C--8EF0
LB,F
 SYMBOL= FLOAT
 AREA USED 8EF1--8F04
 SYMBOL= E10:
 AREA USED 8F05--8F4D
 SYMBOL= ABS
 AREA USED 8F4E--8F59
 SYMBOL= SBT:
 SYMBOL= SAT:
 AREA USED 8F5A--8F74
 SYMBOL= TSA:
 AREA USED 8F75--8F7F
 SYMBOL= RER:
 SYMBOL= RRB:
 AREA USED 8F80--8F8D
 SYMBOL= XTD:
 AREA USED 8F8E--8F9F
 SYMBOL= ERRORF
 SYMBOL= ERRORA
 SYMBOL= FMTERR
 AREA USED 8FA0--8FAC
LN,MP
 NONE
 FLOAT   = 8EF9   FLOW   = 8DA3   RAND  = 8E9E   ABS    = 8F4E
 E10:    = 8F13   SAT:   = 8F5B   RRB:  = 8F81   TSA:   = 8F75
 ERRORA  = 8FA1   XTD:   = 8F9E   SBT:  = 8F5A   RER:   = 8F80
 ERRORF  = 8FA0   FMTERR = 8FA3

FCOM    = 85A0--85C3
 ::::::ORG= 85A0
XE

-0.0378  -0.0632   1.0000        0.8084   0.8990   0.8232
  1   1    5004.    5115.   0.2442  0.6568  0.2571  0.0002  -0.4970  0.9138   -0.1493 -0.0597
  1   2    5007.    5125.   0.2584  0.6592  0.2339  0.0010  -0.5320  0.9104   -0.1580 -0.0632
  1   3    5006.    5137.   0.2877  0.6623  0.2044  0.0022  -0.5878  0.9049   -0.1720 -0.0688

-0.0284  -0.1107   0.9711        0.4850   0.8323   0.9104
  2   1    5013.    4949.  -0.1396  0.6148  0.1771  0.0002  -0.3575  0.7704   -0.1144 -0.1054
  2   2    5009.    4937.  -0.1564  0.6118  0.1775  0.0009  -0.3751  0.8183   -0.1188 -0.1107
  2   3    5015.    4912.  -0.2263  0.6057  0.1779  0.0020  -0.3616  0.8420   -0.1154 -0.1149

-0.0249  -0.1524   0.7774        0.2910   0.6001   0.8183
  3   1    5012.    4982.  -0.0654  0.6231  0.2524  0.0002  -0.2921  0.5494   -0.0980 -0.1447
  3   2    5010.    4983.  -0.0586  0.6233  0.2238  0.0009  -0.3166  0.5755   -0.1041 -0.1524
  3   3    5012.    4999.  -0.0276  0.6274  0.2128  0.0021  -0.3340  0.6189   -0.1085 -0.1583

-0.0131  -0.1743   0.6615        0.1746   0.4735   0.5755
  4   1    5008.    4914.  -0.2059  0.6062  0.4830  0.0002  -0.0863  0.4495   -0.0466 -0.1633
  4   2    5009.    4920.  -0.1969  0.6075  0.4411  0.0009  -0.1197  0.4579   -0.0549 -0.1743
  4   3    5012.    4938.  -0.1621  0.6119  0.3841  0.0020  -0.1719  0.4759   -0.0680 -0.1855

0.0010  -0.1727   0.5911        0.1048   0.4194   0.4579
  5   1    5005.    4899.  -0.2324  0.6025  0.7169  0.0002   0.1464  0.4131    0.0116 -0.1587
  5   2    5005.    4897.  -0.2360  0.6020  0.6904  0.0009   0.1163  0.4102    0.0041 -0.1727
  5   3    5003.    4899.  -0.2287  0.6024  0.6397  0.0020   0.0568  0.4090   -0.0108 -0.1898

0.0120  -0.1527   0.5492        0.0629   0.4085   0.4102
  6   1    5003.    4933.  -0.1523  0.6109  0.8606  0.0002   0.2988  0.4146    0.0497 -0.1388
  6   2    5001.    4918.  -0.1438  0.6070  0.8676  0.0009   0.3001  0.4083    0.0500 -0.1527
  6   3    5007.    4893.  -0.2504  0.6010  0.8638  0.0020   0.3072  0.3986    0.0518 -0.1691
```

|   |   |        |        |         |        |        |        |        |         |        |         |
|---|---|--------|--------|---------|--------|--------|--------|--------|---------|--------|---------|
|   |   | 0.0146 | -0.1283| 0.5241  |        | 0.0377 | 0.4104 | 0.4083 |         |        |         |
| 7 | 1 | 5001.  | 4988.  | -0.0277 | 0.6245 | 0.8735 | 0.0002 | 0.3265 | 0.4175  | 0.0566 | -0.1161 |
| 7 | 2 | 4998.  | 4978.  | -0.0439 | 0.6219 | 0.8969 | 0.0009 | 0.3440 | 0.4108  | 0.0610 | -0.1283 |
| 7 | 3 | 4999.  | 4969.  | -0.0659 | 0.6198 | 0.9378 | 0.0021 | 0.3731 | 0.4105  | 0.0683 | -0.1418 |
|   |   | 0.0149 | -0.1033| 0.5096  |        | 0.0226 | 0.4206 | 0.4108 |         |        |         |
| 8 | 1 | 5004.  | 5001.  | -0.0067 | 0.6276 | 0.8658 | 0.0002 | 0.3332 | 0.4331  | 0.0583 | -0.0928 |
| 8 | 2 | 4997.  | 4994.  | -0.0058 | 0.6261 | 0.8920 | 0.0009 | 0.3497 | 0.4262  | 0.0624 | -0.1033 |
| 8 | 3 | 4998.  | 5005.  | 0.0160  | 0.6289 | 0.8973 | 0.0021 | 0.3562 | 0.4131  | 0.0640 | -0.1162 |
|   |   | 0.0124 | -0.0825| 0.5001  |        | 0.0136 | 0.4299 | 0.4262 |         |        |         |
| 9 | 1 | 5001.  | 5027.  | 0.0577  | 0.6344 | 0.8134 | 0.0002 | 0.2755 | 0.4345  | 0.0439 | -0.0753 |
| 9 | 2 | 5000.  | 5019.  | 0.0418  | 0.6322 | 0.8369 | 0.0009 | 0.3079 | 0.4306  | 0.0520 | -0.0825 |
| 9 | 3 | 5006.  | 5002.  | -0.0074 | 0.6281 | 0.8849 | 0.0021 | 0.3636 | 0.4335  | 0.0659 | -0.0898 |
|   |   |-0.0226 | -0.1329| 0.5898  |        | 0.1714 | 0.4342 | 0.4306 |         |        |         |
| 10| 1 | 5005.  | 5006.  | 0.0035  | 0.6291 | 0.8012 | 0.0002 | 0.2720 | 0.4511  | 0.0430 | -0.0581 |
| 10| 2 | 4687.  | 5012.  | 0.7117  | 0.6305 | 0.8175 | 0.0009 | -0.4040| 0.4349  | -0.1260| -0.1329 |
| 10| 3 | 5005.  | 5041.  | 0.0782  | 0.6377 | 0.8160 | 0.0021 | 0.2854 | 0.4365  | 0.0464 | -0.0713 |
|   |   |-0.0262 | -0.2099| 0.5190  |        | 0.1573 | 0.2829 | 0.4349 |         |        |         |
| 11| 1 | 5003.  | 5029.  | 0.0570  | 0.6349 | 0.7503 | 0.0002 | 0.2141 | 0.4387  | 0.0285 | -0.0466 |
| 11| 2 | 4386.  | 4507.  | 0.2659  | 0.5099 | 0.6483 | 0.0008 | -0.6699| 0.2782  | -0.1925| -0.2099 |
| 11| 3 | 4998.  | 5016.  | 0.0396  | 0.6315 | 0.7969 | 0.0020 | 0.2458 | 0.4365  | 0.0364 | -0.0567 |
|   |   |-0.0100 | -0.2483| 0.4534  |        | 0.1385 | 0.1951 | 0.2782 |         |        |         |
| 12| 1 | 5000.  | 4991.  | -0.0180 | 0.6253 | 0.7814 | 0.0002 | 0.2325 | 0.4655  | 0.0331 | -0.0334 |
| 12| 2 | 4074.  | 3899.  | -0.3857 | 0.3815 | 1.1849 | 0.0007 | -0.2842| 0.1924  | -0.0961| -0.2483 |
| 12| 3 | 5003.  | 4996.  | -0.0155 | 0.6264 | 0.7905 | 0.0018 | 0.2613 | 0.4610  | 0.0403 | -0.0406 |
|   |   | 0.0059 | -0.2194| 0.3953  |        | 0.1185 | 0.1818 | 0.1924 |         |        |         |
| 13| 1 | 5004.  | 5027.  | 0.0520  | 0.6344 | 0.7041 | 0.0002 | 0.1806 | 0.4669  | 0.0201 | -0.0253 |
| 13| 2 | 3761.  | 3454.  | -0.6736 | 0.2994 | 1.9446 | 0.0007 | 0.3893 | 0.1769  | 0.0723 | -0.2194 |
| 13| 3 | 5002.  | 5036.  | 0.0745  | 0.6365 | 0.7202 | 0.0017 | 0.1868 | 0.4613  | 0.0217 | -0.0319 |
|   |   | 0.0078 | -0.1710| 0.3454  |        | 0.0994 | 0.1821 | 0.1769 |         |        |         |
| 14| 1 | 5001.  | 5013.  | 0.0277  | 0.6308 | 0.6958 | 0.0002 | 0.1535 | 0.4711  | 0.0134 | -0.0200 |
| 14| 2 | 3442.  | 3353.  | -0.1940 | 0.2822 | 2.1687 | 0.0006 | 0.5837 | 0.1876  | 0.1209 | -0.1710 |
| 14| 3 | 5003.  | 5008.  | 0.0107  | 0.6294 | 0.7112 | 0.0016 | 0.1762 | 0.4733  | 0.0190 | -0.0243 |
|   |   | 0.0018 | -0.1569| 0.3035  |        | 0.0825 | 0.1484 | 0.1876 |         |        |         |
| 15| 1 | 5003.  | 5006.  | 0.0067  | 0.6289 | 0.6814 | 0.0002 | 0.1467 | 0.4723  | 0.0117 | -0.0153 |
| 15| 2 | 3121.  | 3277.  | 0.3421  | 0.2696 | 1.8421 | 0.0006 | 0.2416 | 0.1435  | 0.0354 | -0.1569 |
| 15| 3 | 5005.  | 5018.  | 0.0270  | 0.6320 | 0.6783 | 0.0016 | 0.1482 | 0.4688  | 0.0121 | -0.0195 |
|   |   | 0.0041 | -0.1188| 0.2691  |        | 0.0684 | 0.1543 | 0.1435 |         |        |         |
| 16| 1 | 4999.  | 5006.  | 0.0143  | 0.6289 | 0.6779 | 0.0002 | 0.1324 | 0.4824  | 0.0081 | -0.0121 |
| 16| 2 | 2812.  | 2703.  | -0.2394 | 0.1834 | 2.1432 | 0.0005 | 0.4807 | 0.1599  | 0.0952 | -0.1188 |
| 16| 3 | 5005.  | 5005.  | -0.0005 | 0.6287 | 0.6880 | 0.0015 | 0.1487 | 0.4809  | 0.0122 | -0.0146 |
|   |   |-0.0004 | -0.1235| 0.2413  |        | 0.0578 | 0.1174 | 0.1599 |         |        |         |
| 17| 1 | 5008.  | 5008.  | 0.0012  | 0.6296 | 0.6504 | 0.0002 | 0.1312 | 0.4720  | 0.0078 | -0.0090 |
| 17| 2 | 2502.  | 2697.  | 0.4276  | 0.1826 | 1.7180 | 0.0005 | 0.0531 | 0.1118  | -0.0117| -0.1235 |
| 17| 3 | 5000.  | 5017.  | 0.0382  | 0.6318 | 0.6570 | 0.0015 | 0.1098 | 0.4664  | 0.0024 | -0.0136 |
|   |   | 0.0017 | -0.1002| 0.2196  |        | 0.0508 | 0.1205 | 0.1118 |         |        |         |
| 18| 1 | 5002.  | 5004.  | 0.0044  | 0.6285 | 0.6783 | 0.0002 | 0.1264 | 0.4880  | 0.0066 | -0.0063 |
| 18| 2 | 2196.  | 2069.  | -0.2797 | 0.1074 | 2.0646 | 0.0005 | 0.3329 | 0.1268  | 0.0582 | -0.1002 |
| 18| 3 | 5006.  | 4983.  | -0.0499 | 0.6233 | 0.6892 | 0.0013 | 0.1596 | 0.4884  | 0.0149 | -0.0077 |
|   |   |-0.0013 | -0.1227| 0.2010  |        | 0.0476 | 0.0770 | 0.1268 |         |        |         |
| 19| 1 | 5000.  | 5014.  | 0.0287  | 0.6309 | 0.6370 | 0.0002 | 0.0977 | 0.4718  | -0.0006| -0.0065 |
| 19| 2 | 1877.  | 2086.  | 0.4577  | 0.1092 | 1.6337 | 0.0005 | -0.1249| 0.0711  | -0.0562| -0.1227 |
| 19| 3 | 5004.  | 5030.  | 0.0566  | 0.6350 | 0.6402 | 0.0014 | 0.1031 | 0.4714  | 0.0008 | -0.0073 |
|   |   | 0.0012 | -0.0972| 0.1861  |        | 0.0483 | 0.0900 | 0.0711 |         |        |         |
| 20| 1 | 5006.  | 4986.  | -0.0444 | 0.6239 | 0.6739 | 0.0002 | 0.1421 | 0.4932  | 0.0105 | -0.0023 |
| 20| 2 | 1564.  | 1346.  | -0.4795 | 0.0455 | 2.1628 | 0.0004 | 0.3547 | 0.0964  | 0.0637 | -0.0972 |
| 20| 3 | 5000.  | 4990.  | -0.0226 | 0.6250 | 0.6763 | 0.0012 | 0.1257 | 0.4899  | 0.0064 | -0.0048 |
|   |   |-0.0012 | -0.1343| 0.1730  |        | 0.0529 | 0.0375 | 0.0964 |         |        |         |
| 21| 1 | 5003.  | 5028.  | 0.0547  | 0.6345 | 0.6273 | 0.0002 | 0.0874 | 0.4738  | -0.0031| -0.0036 |
| 21| 2 | 1249.  | 1534.  | 0.6251  | 0.0591 | 1.5295 | 0.0004 | -0.2705| 0.0316  | -0.0926| -0.1343 |
| 21| 3 | 5007.  | 5014.  | 0.0165  | 0.6310 | 0.6323 | 0.0012 | 0.1092 | 0.4746  | 0.0023 | -0.0039 |
|   |   | 0.0006 | -0.0976| 0.1603  |        | 0.0616 | 0.0633 | 0.0316 |         |        |         |
| 22| 1 | 5002.  | 4986.  | -0.0365 | 0.6239 | 0.6684 | 0.0002 | 0.1239 | 0.4939  | 0.0060 | -0.0012 |
| 22| 2 | 950.   | 814.   | -0.7371 | 0.0095 | 2.2810 | 0.0003 | 0.4667 | 0.0696  | 0.0917 | -0.0976 |
| 22| 3 | 5008.  | 4998.  | -0.0231 | 0.6269 | 0.6693 | 0.0010 | 0.1325 | 0.4950  | 0.0081 | -0.0006 |
|   |   |-0.0001 | -0.1367| 0.1468  |        | 0.0743 | 0.0100 | 0.0696 |         |        |         |
| 23| 1 | 5007.  | 5019.  | 0.0257  | 0.6322 | 0.6233 | 0.0002 | 0.0982 | 0.4763  | -0.0004| -0.0014 |
| 23| 2 | 626.   | 1053.  | 0.9376  | 0.0278 | 1.3808 | 0.0003 | -0.4709| 0.0039  | -0.1427| -0.1367 |
| 23| 3 | 5004.  | 5028.  | 0.0517  | 0.6345 | 0.6228 | 0.0011 | 0.0809 | 0.4743  | -0.0048| -0.0025 |

```
       0.0000   -0.1211    0.1310           0.0910    0.0100    0.0039
 24  1  5006.    4996.   -0.0223    0.6265   0.6040    0.0002    0.1206   0.4943     0.0051    0.0007
 24  2   319.      70.   -0.5451    0.0001   1.9154    0.0002    0.0742   0.0162    -0.0065   -0.1211
 24  3  5003.    4985.   -0.0398    0.6238   0.6668    0.0009    0.1206   0.4931     0.0052   -0.0005

0.0015   -0.1032    0.1117           0.1117    0.0100    0.0162
 25  1  5001.    5021.    0.0430    0.6328   0.6229    0.0002    0.0776   0.4777    -0.0056   -0.0016
 25  2    -1.     247.    0.5438    0.0015   1.3973    0.0003   -0.4697   0.0040    -0.1424   -0.1032
 25  3  5003.    5018.    0.0321    0.6320   0.6251    0.0010    0.0885   0.4783    -0.0029   -0.0016

0.0017   -0.0587    0.0670           0.0670    0.0100    0.0040
 26  1  5002.    4985.   -0.0372    0.6238   0.6572    0.0002    0.1148   0.4930     0.0037   -0.0001
 26  2     5.      40.    0.0781    0.0000   0.6082    0.0002   -0.5477   0.0160    -0.1619   -0.0587
 26  3  5006.    4991.   -0.0329    0.6253   0.6574    0.0009    0.1210   0.4939     0.0053    0.0005

0.0024   -0.0326    0.0402           0.0402    0.0100    0.0160
 27  1  4999.    5015.    0.0332    0.6312   0.6245    0.0002    0.0816   0.4776    -0.0046   -0.0019
 27  2     5.     123.    0.2584    0.0004   0.3596    0.0002   -0.8061   0.0040    -0.2265   -0.0326
 27  3  5004.    5021.    0.0373    0.6327   0.6237    0.0010    0.0837   0.4785    -0.0041   -0.0011

0.0025   -0.0166    0.0241           0.0241    0.0100    0.0040
 28  1  5004.    4985.   -0.0421    0.6237   0.6576    0.0002    0.1237   0.4940     0.0059    0.0004
 28  2     8.      29.    0.0459    0.0000   0.3102    0.0002   -0.8520   0.0160    -0.2380   -0.0166
 28  3  5003.    4990.   -0.0284    0.6250   0.6564    0.0009    0.1124   0.4931     0.0031    0.0001

0.0029   -0.0074    0.0145           0.0145    0.0100    0.0160
 29  1  5001.    5020.    0.0423    0.6326   0.6234    0.0002    0.0813   0.4781    -0.0047   -0.0014
 29  2     9.      81.    0.1592    0.0002   0.1556    0.0002   -1.0111   0.0040    -0.2778   -0.0074
 29  3  4999.    5015.    0.0342    0.6312   0.6243    0.0009    0.0782   0.4772    -0.0054   -0.0021

0.0030   -0.0017    0.0087           0.0087    0.0100    0.0040
 30  1  5000.    4987.   -0.0284    0.6241   0.6567    0.0002    0.1097   0.4923     0.0024   -0.0004
 30  2    10.      19.    0.0191    0.0000   0.1341    0.0002   -1.0302   0.0159    -0.2826   -0.0017
 30  3  5002.    4983.   -0.0422    0.6232   0.6581    0.0009    0.1205   0.4933     0.0051   -0.0000

0.0032    0.0016    0.0052           0.0052    0.0100    0.0159
 31  1  5008.    5010.    0.0440    0.6300   0.6249    0.0002    0.1053   0.4810     0.0013    0.0001
 31  2    10.      48.    0.0826    0.0001   0.0546    0.0002   -1.1128   0.0042    -0.3032    0.0016
 31  3  4999.    5017.    0.0386    0.6318   0.6242    0.0009    0.0818   0.4779    -0.0045   -0.0018

0.0032    0.0037    0.0031           0.0031    0.0100    0.0042
 32  1  5001.    5004.    0.0075    0.6285   0.6532    0.0002    0.0978   0.4919    -0.0005   -0.0001
 32  2    11.      12.    0.0025    0.0000   0.0507    0.0002   -1.1153   0.0158    -0.3038    0.0037
 32  3  5004.    4985.   -0.0403    0.6238   0.6568    0.0009    0.1222   0.4936     0.0055    0.0004

0.0033    0.0048    0.0019           0.0019    0.0100    0.0158
 33  1  5002.    5006.    0.0077    0.6290   0.6250    0.0002    0.0901   0.4789    -0.0025   -0.0011
 33  2    11.      27.    0.0349    0.0000   0.0177    0.0002   -1.1501   0.0041    -0.3125    0.0048
 33  3  4999.    5019.    0.0440    0.6323   0.6240    0.0009    0.0782   0.4776    -0.0055   -0.0018

0.0033    0.0056    0.0011           0.0011    0.0100    0.0041
 34  1  5000.    4992.   -0.0175    0.6254   0.6558    0.0002    0.1077   0.4923     0.0019   -0.0004
 34  2    12.       8.   -0.0071    0.0000   0.0242    0.0002   -1.1429   0.0159    -0.3107    0.0056
 34  3  5005.    4983.   -0.0479    0.6233   0.6570    0.0009    0.1261   0.4944     0.0065    0.0008

0.0033    0.0060    0.0007           0.0007    0.0100    0.0159
 35  1  5007.    5009.    0.0054    0.6298   0.6248    0.0002    0.1023   0.4806     0.0006   -0.0001
 35  2    11.      19.    0.0165    0.0000   0.0085    0.0002   -1.1595   0.0042    -0.3149    0.0060
 35  3  5000.    5022.    0.0495    0.6332   0.6228    0.0009    0.0765   0.4779    -0.0059   -0.0015

0.0033    0.0063    0.0004           0.0004    0.0100    0.0042
 36  1  5003.    5002.   -0.0021    0.6279   0.6538    0.0002    0.1044   0.4927     0.0011    0.0003
 36  2    12.       7.   -0.0099    0.0000   0.0178    0.0002   -1.1497   0.0158    -0.3124    0.0063
 36  3  5001.    4984.   -0.0381    0.6234   0.6565    0.0009    0.1147   0.4928     0.0037   -0.0001

0.0033    0.0064    0.0002           0.0002    0.0100    0.0158
 37  1  5005.    5011.    0.0137    0.6302   0.6242    0.0002    0.0910   0.4795    -0.0022   -0.0006
 37  2    11.      17.    0.0114    0.0000   0.0068    0.0002   -1.1613   0.0042    -0.3153    0.0064
 37  3  4999.    5013.    0.0306    0.6309   0.6247    0.0009    0.0841   0.4781    -0.0040   -0.0017

0.0033    0.0066    0.0001           0.0001    0.0100    0.0042
 38  1  5001.    4995.   -0.0141    0.6261   0.6548    0.0002    0.1051   0.4925     0.0013   -0.0001
 38  2    12.       7.   -0.0103    0.0000   0.0166    0.0002   -1.1510   0.0159    -0.3127    0.0066
 38  3  5006.    4986.   -0.0431    0.6241   0.6565    0.0009    0.1271   0.4947     0.0068    0.0010

0.0033    0.0066    0.0001           0.0001    0.0100    0.0159
 39  1  5000.    5009.    0.0216    0.6299   0.6246    0.0002    0.0836   0.4779    -0.0041   -0.0017
 39  2    12.      16.    0.0107    0.0000   0.0064    0.0002   -1.1617   0.0041    -0.3154    0.0066
 39  3  5005.    5024.    0.0421    0.6335   0.6225    0.0009    0.0851   0.4793    -0.0037   -0.0004

0.0033    0.0067    0.0001           0.0001    0.0100    0.0041
 40  1  5007.    4986.   -0.0450    0.6240   0.6570    0.0002    0.1294   0.4950     0.0074    0.0012
 40  2    12.       7.   -0.0104    0.0000   0.0166    0.0002   -1.1510   0.0159    -0.3128    0.0067
 40  3  5000.    4992.   -0.0167    0.6256   0.6547    0.0002    0.1020   0.4921     0.0005   -0.0002
```

```
     0.0033    0.0067    0.0000         0.0000    0.0100    0.0159
41   1   5001.   5026.   0.0543   0.6340   0.6222   0.0002   0.0751   0.4779   -0.0062  -0.0013
41   2    12.     16.    0.0107   0.0000   0.0064   0.0002  -1.1617   0.0040   -0.3154   0.0066
41   3   5000.   5007.   0.0159   0.6293   0.6248   0.0009   0.0862   0.4781  -0.0035  -0.0016

0.0033    0.0067    0.0000         0.0000    0.0100    0.0040
42   1   5002.   4984.  -0.0392   0.6235   0.6564   0.0002   0.1143   0.4932   0.0036   0.0002
42   2    12.      7.   -0.0109   0.0000   0.0167   0.0002  -1.1509   0.0160  -0.3127   0.0067
42   3   5004.   4987.  -0.0367   0.6244   0.6569   0.0009   0.1229   0.4942   0.0057   0.0007

0.0033    0.0067    0.0000         0.0000    0.0100    0.0160
43   1   5004.   5014.   0.0227   0.6311   0.6239   0.0002   0.0916   0.4795  -0.0021  -0.0007
43   2    12.     16.    0.0109   0.0000   0.0064   0.0002  -1.1617   0.0042  -0.3154   0.0067
43   3   5006.   5020.   0.0311   0.6326   0.6229   0.0009   0.0915   0.4800  -0.0021  -0.0002

0.0033    0.0067    0.0000         0.0000    0.0100    0.0042
44   1   5001.   4994.  -0.0140   0.6261   0.6548   0.0002   0.1056   0.4923   0.0014  -0.0001
44   2    12.      7.   -0.0104   0.0000   0.0163   0.0002  -1.1513   0.0157  -0.3128   0.0067
44   3   5004.   4996.  -0.0163   0.6266   0.6540   0.0009   0.1078   0.4931   0.0019   0.0006

0.0033    0.0067    0.0000         0.0000    0.0100    0.0157
45   1   5003.   5009.   0.0139   0.6298   0.6250   0.0002   0.0917   0.4793  -0.0021  -0.0009
45   2    12.     16.    0.0104   0.0000   0.0064   0.0002  -1.1617   0.0042  -0.3154   0.0067
45   3   5005.   5013.   0.0193   0.6308   0.6239   0.0009   0.0886   0.4795  -0.0029  -0.0006

0.0033    0.0067    0.0000         0.0000    0.0100    0.0042
46   1   5006.   4993.  -0.0278   0.6258   0.6551   0.0002   0.1195   0.4942   0.0049   0.0010
46   2    12.      7.   -0.0103   0.0000   0.0162   0.0002  -1.1514   0.0158  -0.3129   0.0067
46   3   5000.   4994.  -0.0143   0.6259   0.6546   0.0009   0.1029   0.4920   0.0007  -0.0003

0.0033    0.0067    0.0000         0.0000    0.0100    0.0158
47   1   5002.   5020.   0.0410   0.6326   0.6229   0.0002   0.0785   0.4784  -0.0054  -0.0011
47   2    12.     16.    0.0103   0.0000   0.0064   0.0002  -1.1617   0.0042  -0.3154   0.0067
47   3   5005.   5007.   0.0054   0.6294   0.6251   0.0009   0.0973   0.4799  -0.0007  -0.0005

0.0033    0.0067    0.0000         0.0000    0.0100    0.0042
48   1   5007.   4986.  -0.0459   0.6241   0.6559   0.0002   0.1240   0.4947   0.0060   0.0013
48   2    12.      7.   -0.0107   0.0000   0.0163   0.0002  -1.1513   0.0159  -0.3128   0.0067
48   3   5000.   4998.  -0.0059   0.6269   0.6546   0.0009   0.1031   0.4922   0.0008  -0.0002

0.0033    0.0067    0.0000         0.0000    0.0100    0.0159
49   1   5002.   5024.   0.0470   0.6334   0.6224   0.0002   0.0770   0.4782  -0.0057  -0.0010
49   2    12.     16.    0.0109   0.0000   0.0064   0.0002  -1.1617   0.0040  -0.3154   0.0067
49   3   4999.   5008.   0.0185   0.6294   0.6249   0.0009   0.0845   0.4779  -0.0039  -0.0018

0.0033    0.0067    0.0000         0.0000    0.0100    0.0040
50   1   5000.   4986.  -0.0307   0.6240   0.6561   0.0002   0.1079   0.4925   0.0020  -0.0003
50   2    12.      7.   -0.0109   0.0000   0.0167   0.0002  -1.1510   0.0160  -0.3127   0.0067
50   3   5008.   4986.  -0.0473   0.6240   0.6572   0.0009   0.1318   0.4954   0.0080   0.0014

0.0033    0.0067    0.0000         0.0000    0.0100    0.0160
51   1   5005.   5010.   0.0115   0.6300   0.6246   0.0002   0.0965   0.4797  -0.0009  -0.0006
51   2    12.     16.    0.0109   0.0000   0.0063   0.0002  -1.1618   0.0040  -0.3154   0.0067
51   3   5000.   5028.   0.0600   0.6345   0.6216   0.0009   0.0718   0.4776  -0.0070  -0.0014

0.0033    0.0067    0.0000         0.0000    0.0100    0.0040
52   1   5004.   4997.  -0.0155   0.6267   0.6550   0.0002   0.1120   0.4935   0.0030   0.0006
52   2    12.      7.   -0.0107   0.0000   0.0166   0.0002  -1.1510   0.0159  -0.3128   0.0067
52   3   5002.   4982.  -0.0449   0.6230   0.6567   0.0009   0.1163   0.4933   0.0041   0.0002

0.0033    0.0067    0.0000         0.0000    0.0100    0.0159
53   1   5008.   5015.   0.0159   0.6313   0.6234   0.0002   0.0962   0.4806  -0.0010   0.0002
53   2    12.     16.    0.0107   0.0000   0.0064   0.0002  -1.1617   0.0042  -0.3154   0.0067
53   3   5002.   5015.   0.0309   0.6314   0.6240   0.0009   0.0858   0.4787  -0.0035  -0.0012

0.0033    0.0067    0.0000         0.0000    0.0100    0.0042
54   1   5007.   5000.  -0.0151   0.6276   0.6533   0.0002   0.1113   0.4941   0.0028   0.0013
54   2    12.      7.   -0.0104   0.0000   0.0163   0.0002  -1.1513   0.0158  -0.3128   0.0067
54   3   5003.   4989.  -0.0307   0.6248   0.6557   0.0009   0.1165   0.4935   0.0041   0.0004

0.0033    0.0067    0.0000         0.0000    0.0100    0.0158
55   1   5001.   5018.   0.0373   0.6321   0.6225   0.0002   0.0740   0.4778  -0.0065  -0.0013
55   2    12.     16.    0.0104   0.0000   0.0064   0.0002  -1.1617   0.0040  -0.3154   0.0067
55   3   5002.   5017.   0.0325   0.6317   0.6237   0.0009   0.0843   0.4785  -0.0039  -0.0011

0.0033    0.0067    0.0000         0.0000    0.0100    0.0040
56   1   5008.   4984.  -0.0535   0.6235   0.6567   0.0002   0.1275   0.4952   0.0069   0.0015
56   2    12.      7.   -0.0109   0.0000   0.0167   0.0002  -1.1509   0.0160  -0.3127   0.0067
56   3   5001.   4989.  -0.0267   0.6247   0.6561   0.0009   0.1112   0.4929   0.0028  -0.0000

0.0033    0.0067    0.0000         0.0000    0.0100    0.0160
57   1   5004.   5026.   0.0480   0.6341   0.6217   0.0002   0.0795   0.4789  -0.0051  -0.0006
57   2    12.     16.    0.0109   0.0000   0.0064   0.0002  -1.1617   0.0040  -0.3154   0.0067
57   3   5001.   5012.   0.0250   0.6306   0.6240   0.0009   0.0862   0.4783  -0.0035  -0.0014
```

```
     0.0033    0.0067    0.000A              0.0000    0.0100    0.0040
58    1   5005.   4990.  -0.0340   0.6249   0.6553   0.0002   0.1135   0.4937           0.0034   0.0008
58    2    12.      7.  -0.0109   0.0000   0.0167   0.0002  -1.1510   0.0159          -0.3127   0.0067
58    3   5001.   4989.  -0.0285   0.6246   0.6565   0.0009             0.1146   0.4931   0.0037   0.0001

0.0033    0.0067    0.000A              0.0000    0.0100    0.0159
59    1   5006.   5017.   0.0241   0.6318   0.6233   0.0002   0.0891   0.4797          -0.0027  -0.0003
59    2    12.     16.   0.0107   0.0000   0.0064   0.0002  -1.1617   0.0042          -0.3154   0.0067
59    3   5002.   5014.   0.0259   0.6310   0.6241   0.0009             0.0889   0.4790  -0.0028  -0.0010

0.0033    0.0067    0.000A              0.0000    0.0100    0.0042
60    1   4999.   4995.  -0.0093   0.6263   0.6544   0.0002   0.0982   0.4915          -0.0004  -0.0005
60    2    12.      7.  -0.0109   0.0000   0.0164   0.0002  -1.1513   0.0157          -0.3128   0.0067
60    3   5000.   4991.  -0.0202   0.6253   0.6554   0.0009             0.1090   0.4924   0.0023  -0.0001

0.0017   -0.1169    0.1361              0.0961    0.0209    0.0157
61    1   5003.   5005.   0.0031   0.6286   0.6258   0.0002   0.0951   0.4801          -0.0012  -0.0010
61    2    23.     16.  -0.0151   0.0000   0.0065   0.0002  -1.1361   0.0203          -0.3090  -0.1169
61    3   5006.   5010.   0.0097   0.6301   0.6250   0.0009             0.0993   0.4811  -0.0002  -0.0002

0.0000   -0.1069    0.1600              0.0875    0.0531    0.0203
62    1   5000.   4995.  -0.0107   0.6264   0.6536   0.0002   0.1058   0.4932           0.0014  -0.0004
62    2   640.    31.  -1.3361   0.0000   0.0142   0.0002   0.1999   0.0586           0.0250  -0.1069
62    3   5000.   5000.   0.0003   0.6276   0.6521   0.0009             0.0989   0.4930  -0.0003  -0.0003

0.0008   -0.0617    0.1752              0.0765    0.1142    0.0586
63    1   5002.   5010.   0.0164   0.6300   0.6227   0.0002   0.0894   0.4816          -0.0027  -0.0015
63    2   936.   775.  -0.3519   0.0151   1.0557   0.0003   0.5518   0.1183           0.1130  -0.0617
63    3   5000.   5007.   0.0155   0.6292   0.6226   0.0011             0.0834   0.4808  -0.0041  -0.0020

0.0008   -0.0367    0.1856              0.0656    0.1497    0.1183
64    1   5002.   4994.  -0.0163   0.6260   0.6491   0.0002   0.1056   0.4927           0.0014  -0.0009
64    2   1252.  1344.   0.2917   0.0453   0.7790   0.0004   0.3501   0.1552           0.0625  -0.0367
64    3   5001.   4989.  -0.0268   0.6247   0.6500   0.0012             0.1102   0.4928   0.0025  -0.0010

0.0007   -0.0222    0.1943              0.0565    0.1727    0.1552
65    1   5005.   5010.   0.0111   0.6301   0.6242   0.0002   0.0945   0.4801          -0.0014  -0.0015
65    2   1568.  1616.   0.1259   0.0655   0.6541   0.0004   0.2447   0.1769           0.0362  -0.0222
65    3   5005.   5012.   0.0153   0.6305   0.6242   0.0012             0.0944   0.4800  -0.0014  -0.0015

0.0010   -0.0060    0.2034              0.0500    0.1984    0.1769
66    1   5006.   4997.  -0.0205   0.6267   0.6539   0.0002   0.1150   0.4937           0.0038   0.0001
66    2   1874.  1865.  -0.0174   0.0873   0.6712   0.0004   0.2625   0.2041           0.0406  -0.0060
66    3   5002.   4996.  -0.0132   0.6265   0.6539   0.0013             0.1077   0.4925   0.0019  -0.0007

0.0017    0.0169    0.2140              0.0467    0.2335    0.2041
67    1   5008.   5018.   0.0221   0.6321   0.6236   0.0002   0.0929   0.4814          -0.0018  -0.0007
67    2   2193.  2163.  -0.0663   0.1174   0.6780   0.0005   0.3289   0.2376           0.0572   0.0169
67    3   5003.   5011.   0.0173   0.6303   0.6248   0.0014             0.0904   0.4802  -0.0024  -0.0017

0.0020    0.0393    0.2305              0.0470    0.2717    0.2376
68    1   5003.   5000.  -0.0057   0.6275   0.6512   0.0002   0.0987   0.4925          -0.0003  -0.0008
68    2   2497.  2499.   0.0040   0.1568   0.6676   0.0005   0.3239   0.2772           0.0560   0.0393
68    3   5000.   4994.  -0.0136   0.6259   0.6529   0.0014             0.1040   0.4922   0.0010  -0.0013

0.0027    0.0644    0.2517              0.0510    0.3187    0.2772
69    1   5002.   5008.   0.0140   0.6295   0.6242   0.0002   0.0846   0.4798          -0.0038  -0.0023
69    2   2817.  2805.  -0.0272   0.1975   0.6180   0.0006   0.3511   0.3229           0.0628   0.0644
69    3   5003.   5008.   0.0097   0.6295   0.6247   0.0015             0.0943   0.4808  -0.0014  -0.0019

0.0031    0.0883    0.2799              0.0589    0.3713    0.3229
70    1   5002.   4990.  -0.0271   0.6250   0.6528   0.0002   0.1121   0.4938           0.0030  -0.0011
70    2   3131.  3137.   0.0124   0.2470   0.5698   0.0006   0.3386   0.3770           0.0596   0.0883
70    3   5009.   4996.  -0.0285   0.6265   0.6517   0.0016             0.1228   0.4959   0.0057   0.0004

0.0035    0.1101    0.3167              0.0708    0.4303    0.3770
71    1   5008.   5014.   0.0134   0.6311   0.6224   0.0002   0.0987   0.4820          -0.0003  -0.0013
71    2   3442.  3451.   0.0199   0.2989   0.5058   0.0007   0.3186   0.4342           0.0547   0.1101
71    3   5002.   5025.   0.0515   0.6339   0.6199   0.0017             0.0713   0.4794  -0.0072  -0.0025

0.0045    0.1324    0.3634              0.0866    0.5003    0.4342
72    1   5008.   5002.  -0.0125   0.6281   0.6500   0.0002   0.1112   0.4955           0.0028  -0.0001
72    2   3754.  3752.  -0.0041   0.3534   0.4508   0.0007   0.3228   0.5058           0.0557   0.1324
72    3   5002.   4985.  -0.0375   0.6236   0.6524   0.0017             0.1088   0.4939   0.0022  -0.0016

0.0055    0.1536    0.4213              0.1064    0.5804    0.5058
73    1   5006.   5020.   0.0301   0.6326   0.6195   0.0002   0.0808   0.4814          -0.0048  -0.0021
73    2   4061.  4066.   0.0107   0.4150   0.3901   0.0008   0.3118   0.5843           0.0530   0.1536
73    3   5005.   5012.   0.0159   0.6306   0.6217   0.0018             0.0929   0.4818  -0.0018  -0.0023

0.0083    0.1779    0.4919              0.1303    0.6781    0.5843
74    1   5008.   4994.  -0.0314   0.6259   0.6495   0.0002   0.1124   0.4962           0.0031  -0.0008
74    2   4378.  4364.  -0.0317   0.4780   0.3367   0.0008   0.3435   0.6836           0.0609   0.1779
74    3   5009.   4998.  -0.0246   0.6269   0.6495   0.0019             0.1175   0.4968   0.0044  -0.0005
```

```
      0.0115    0.2036    0.5765          0.1582    0.7916    0.6836
75   1   5008.    5021.   0.0281   0.6328   0.6179   0.0002   0.0843   0.4827   -0.0039  -0.0024
75   2   4692.    4686.  -0.0127   0.5512   0.2836   0.0009   0.3565   0.7952    0.0641   0.2036
75   3   5003.    5024.   0.0456   0.6336   0.6172   0.0020   0.0719   0.4811   -0.0070  -0.0034
      0.0159    0.2302    0.6765          0.1901    0.9226    0.7952
76   1   5003.    4998.  -0.0107   0.6269   0.6471   0.0002   0.0952   0.4947   -0.0012  -0.0029
76   2   4997.    4993.  -0.0097   0.6257   0.2380   0.0009   0.3662   0.9278    0.0665   0.2302
76   3   5002.    4988.  -0.0310   0.6244   0.6487   0.0021   0.1029   0.4949    0.0007  -0.0031
     -0.0219    0.1936    0.6005          0.1141    0.7722    0.9278
77   1   5007.    5009.   0.0051   0.6297   0.6187   0.0002   0.0900   0.4685   -0.0025  -0.0039
77   2   4999.    5287.   0.6318   0.7016   0.1960   0.0010  -0.2656   0.7660   -0.0914   0.1936
77   3   5007.    5011.   0.0101   0.6303   0.6188   0.0022   0.0928   0.4688   -0.0018  -0.0038
     -0.0212    0.1582    0.5548          0.0684    0.6918    0.7660
78   1   5002.    4984.  -0.0392   0.6235   0.6830   0.0002   0.1292   0.4894    0.0073  -0.0010
78   2   5010.    5005.  -0.0110   0.6289   0.2578   0.0009  -0.2546   0.6887   -0.0887   0.1582
78   3   5002.    4985.  -0.0380   0.6238   0.6826   0.0021   0.1308   0.4898    0.0077  -0.0007
     -0.0203    0.1243    0.5275          0.0411    0.6315    0.6887
79   1   4999.    5016.   0.0367   0.6314   0.6339   0.0002   0.0924   0.4761   -0.0019  -0.0017
79   2   5003.    4996.  -0.0157   0.6265   0.3176   0.0009  -0.2389   0.6260   -0.0847   0.1243
79   3   5000.    5017.   0.0372   0.6318   0.6334   0.0021   0.0936   0.4765   -0.0016  -0.0013
     -0.0155    0.0983    0.5118          0.0246    0.5938    0.6260
80   1   5004.    4987.  -0.0375   0.6241   0.6621   0.0002   0.1300   0.4934    0.0075   0.0013
80   2   5006.    4970.  -0.0798   0.6200   0.3805   0.0009  -0.1595   0.5901   -0.0649   0.0983
80   3   5000.    4989.  -0.0257   0.6246   0.6614   0.0021   0.1195   0.4922    0.0049   0.0006
     -0.0131    0.0764    0.5017          0.0148    0.5645    0.5901
81   1   5003.    5021.   0.0319   0.6329   0.6250   0.0002   0.0886   0.4793   -0.0028   0.0001
81   2   5003.    4985.  -0.0402   0.6237   0.4307   0.0009  -0.1193   0.5588   -0.0548   0.0764
81   3   5003.    5014.   0.0232   0.6309   0.6262   0.0021   0.0963   0.4798   -0.0009   0.0002
     -0.0091    0.0613    0.4953          0.0089    0.5475    0.5588
82   1   5002.    4991.  -0.0231   0.6253   0.6546   0.0002   0.1118   0.4933    0.0029   0.0013
82   2   5009.    4979.  -0.0679   0.6221   0.4791   0.0009  -0.0514   0.5434   -0.0379   0.0613
82   3   5004.    4995.  -0.0190   0.6263   0.6543   0.0021   0.1153   0.4940    0.0038   0.0018
     -0.0086    0.0469    0.4917          0.0053    0.5301    0.5434
83   1   5003.    5013.   0.0220   0.6308   0.6233   0.0002   0.0898   0.4801   -0.0026   0.0003
83   2   5003.    4999.  -0.0083   0.6273   0.5108   0.0009  -0.0432   0.5244   -0.0358   0.0469
83   3   5006.    5016.   0.0234   0.6316   0.6225   0.0021   0.0917   0.4808   -0.0021   0.0009
     -0.0060    0.0369    0.4896          0.0032    0.5205    0.5244
84   1   5000.    4993.  -0.0142   0.6257   0.6529   0.0002   0.1047   0.4926    0.0012   0.0008
84   2   5002.    4983.  -0.0431   0.6231   0.5449   0.0009  -0.0000   0.5213   -0.0250   0.0369
84   3   5004.    4997.  -0.0170   0.6266   0.6518   0.0021   0.1088   0.4939    0.0022   0.0018
     -0.0044    0.0295    0.4883          0.0019    0.5134    0.5213
85   1   5005.    5008.   0.0070   0.6295   0.6237   0.0002   0.0977   0.4810   -0.0006   0.0005
85   2   5008.    4996.  -0.0253   0.6264   0.5543   0.0009   0.0258   0.5077   -0.0186   0.0295
85   3   5002.    5014.   0.0281   0.6311   0.6221   0.0021   0.0804   0.4794   -0.0049  -0.0001
     -0.0038    0.0232    0.4875          0.0011    0.5069    0.5077
86   1   5007.    4998.  -0.0193   0.6270   0.6519   0.0002   0.1169   0.4950    0.0042   0.0022
86   2   5004.    4999.  -0.0107   0.6271   0.5852   0.0009   0.0367   0.5078   -0.0158   0.0232
86   3   5001.    4988.  -0.0287   0.6244   0.6533   0.0021   0.1087   0.4930    0.0022   0.0007
     -0.0035    0.0173    0.4871          0.0007    0.5009    0.5078
87   1   5003.    5021.   0.0392   0.6327   0.6209   0.0002   0.0777   0.4794   -0.0056   0.0000
87   2   5002.    4999.  -0.0046   0.6274   0.5851   0.0009   0.0412   0.4951   -0.0147   0.0173
87   3   5005.    5011.   0.0132   0.6301   0.6233   0.0021   0.0956   0.4806   -0.0011   0.0003
     -0.0019    0.0141    0.4868          0.0004    0.4989    0.4951
88   1   5006.    4988.  -0.0405   0.6244   0.6534   0.0002   0.1182   0.4948    0.0046   0.0018
88   2   5000.    4988.  -0.0262   0.6245   0.6128   0.0009   0.0675   0.4998   -0.0081   0.0141
88   3   5001.    4997.  -0.0083   0.6267   0.6525   0.0021   0.1038   0.4930    0.0010   0.0007
     -0.0017    0.0113    0.4866          0.0002    0.4963    0.4998
89   1   5003.    5020.   0.0360   0.6326   0.6213   0.0002   0.0813   0.4796   -0.0047  -0.0000
89   2   5003.    5001.  -0.0047   0.6278   0.6044   0.0009   0.0722   0.4954   -0.0070   0.0113
89   3   5001.    5009.   0.0173   0.6297   0.6230   0.0021   0.0859   0.4792   -0.0035  -0.0007
     -0.0014    0.0090    0.4865          0.0001    0.4941    0.4954
90   1   5004.    4990.  -0.0311   0.6249   0.6532   0.0002   0.1125   0.4937    0.0031   0.0012
90   2   5003.    5001.  -0.0048   0.6278   0.6152   0.0009   0.0770   0.4950   -0.0058   0.0090
90   3   5002.    4989.  -0.0287   0.6246   0.6542   0.0021   0.1148   0.4934    0.0037   0.0007
     -0.0014    0.0066    0.4865          0.0001    0.4917    0.4950
91   1   5007.    5015.   0.0182   0.6313   0.6228   0.0002   0.0935   0.4809   -0.0016   0.0006
91   2   5003.    5003.   0.0004   0.6283   0.6165   0.0009   0.0763   0.4909   -0.0059   0.0066
91   3   4999.    5014.   0.0326   0.6310   0.6234   0.0021   0.0822   0.4788   -0.0044  -0.0010
```

```
        -0.0008    0.0053    0.4864           0.0001    0.4909    0.4909
  92   1   5000.    4998.   -0.0047    0.6270  0.6519   0.0002   0.0982  0.4921   -0.0004   0.0004
  92   2   5003.    4998.   -0.0107    0.6271  0.6258   0.0009   0.0868  0.4917   -0.0033   0.0053
  92   3   5000.    4986.   -0.0321    0.6239  0.6546   0.0021   0.1143  0.4929    0.0036   0.0004

-0.0011    0.0034    0.4864           0.0000    0.4887    0.4917
  93   1   5003.    5006.    0.0061    0.6289  0.6245   0.0002   0.0921  0.4800   -0.0020  -0.0004
  93   2   5000.    5003.    0.0054    0.6283  0.6250   0.0009   0.0810  0.4880   -0.0048   0.0034
  93   3   5003.    5012.    0.0210    0.6306  0.6241   0.0021   0.0933  0.4802   -0.0017  -0.0003

0.0002    0.0036    0.4864           0.0000    0.4902    0.4880
  94   1   5001.    4994.   -0.0166    0.6259  0.6533   0.0002   0.1087  0.4929    0.0022   0.0005
  94   2   5005.    4995.   -0.0216    0.6263  0.6325   0.0009   0.1026  0.4910    0.0006   0.0036
  94   3   5007.    4994.   -0.0284    0.6261  0.6528   0.0021   0.1217  0.4951    0.0054   0.0019

-0.0009    0.0022    0.4864           0.0000    0.4877    0.4910
  95   1   5003.    5011.    0.0167    0.6302  0.6237   0.0002   0.0922  0.4799   -0.0019  -0.0003
  95   2   5002.    5010.    0.0173    0.6301  0.6283   0.0009   0.0854  0.4868   -0.0036   0.0022
  95   3   4999.    5023.    0.0519    0.6332  0.6213   0.0021   0.0698  0.4779   -0.0075  -0.0011

-0.0003    0.0016    0.4864           0.0000    0.4877    0.4868
  96   1   5000.    4994.   -0.0130    0.6260  0.6537   0.0002   0.1052  0.4925    0.0013   0.0002
  96   2   5001.    4997.   -0.0080    0.6269  0.6362   0.0009   0.0943  0.4886   -0.0014   0.0016
  96   3   5006.    4980.   -0.0574    0.6225  0.6554   0.0021   0.1272  0.4950    0.0068   0.0016

-0.0003    0.0012    0.4864           0.0000    0.4873    0.4886
  97   1   5000.    5008.    0.0172    0.6296  0.6241   0.0002   0.0873  0.4791   -0.0032  -0.0011
  97   2   5002.    5002.   -0.0013    0.6279  0.6325   0.0009   0.0956  0.4865   -0.0011   0.0012
  97   3   5009.    5024.    0.0337    0.6335  0.6217   0.0021   0.0935  0.4815   -0.0016   0.0009

0.0007    0.0023    0.4864           0.0000    0.4893    0.4865
  98   1   5009.    4989.   -0.0442    0.6246  0.6544   0.0002   0.1315  0.4958    0.0079   0.0021
  98   2   5008.    5001.   -0.0155    0.6277  0.6378   0.0009   0.1111  0.4902    0.0028   0.0023
  98   3   5006.    5000.   -0.0123    0.6276  0.6510   0.0021   0.1057  0.4940    0.0014   0.0015

-0.0013    0.0001    0.4864           0.0000    0.4852    0.4902
  99   1   4999.    5028.    0.0642    0.6346  0.6207   0.0002   0.0673  0.4775   -0.0082  -0.0012
  99   2   5000.    5015.    0.0327    0.6312  0.6316   0.0009   0.0784  0.4791   -0.0054   0.0001
  99   3   5002.    5015.    0.0275    0.6312  0.6221   0.0021   0.0782  0.4785   -0.0054  -0.0007

0.0016    0.0028    0.4864           0.0000    0.4908    0.4791
 100   1   5009.    4979.   -0.0656    0.6222  0.6562   0.0002   0.1328  0.4965    0.0082   0.0021
 100   2   5007.    4985.   -0.0484    0.6238  0.6535   0.0009   0.1268  0.4969    0.0067   0.0028
 100   3   5004.    4986.   -0.0379    0.6241  0.6553   0.0021   0.1160  0.4945    0.0040   0.0009

-0.0008    0.0014    0.4864           0.0000    0.4870    0.4969
 101   1   5002.    5029.    0.0607    0.6349  0.6193   0.0002   0.0722  0.4781   -0.0070  -0.0007
 101   2   5008.    5026.    0.0409    0.6341  0.6175   0.0009   0.0862  0.4810   -0.0034  -0.0014
 101   3   5006.    5017.    0.0239    0.6318  0.6213   0.0021   0.0926  0.4800   -0.0019   0.0002

0.0006    0.0024    0.4864           0.0000    0.4894    0.4810
 102   1   5002.    4983.   -0.0407    0.6233  0.6557   0.0002   0.1129  0.4936    0.0032   0.0006
 102   2   5007.    4996.   -0.0234    0.6266  0.6514   0.0009   0.1098  0.4953    0.0025   0.0024
 102   3   5003.    4997.   -0.0148    0.6267  0.6540   0.0021   0.1073  0.4937    0.0018   0.0009

-0.0008    0.0010    0.4864           0.0000    0.4866    0.4953
 103   1   5002.    5014.    0.0262    0.6310  0.6228   0.0002   0.0867  0.4790   -0.0033  -0.0007
 103   2   5008.    5018.    0.0235    0.6321  0.6197   0.0009   0.0864  0.4808   -0.0034   0.0010
 103   3   5006.    5013.    0.0161    0.6307  0.6224   0.0021   0.0912  0.4800   -0.0022   0.0000

-0.0004    0.0003    0.4864           0.0000    0.4863    0.4808
 104   1   4999.    4990.   -0.0204    0.6249  0.6549   0.0002   0.1072  0.4924    0.0018  -0.0000
 104   2   4999.    4996.   -0.0063    0.6266  0.6518   0.0009   0.0926  0.4920   -0.0018   0.0003
 104   3   4999.    4996.   -0.0079    0.6264  0.6536   0.0021   0.0991  0.4919   -0.0002  -0.0000

-0.0008   -0.0011    0.4864           0.0000    0.4845    0.4920
 105   1   4999.    5008.    0.0201    0.6296  0.6244   0.0002   0.0870  0.4785   -0.0032  -0.0013
 105   2   4999.    5002.    0.0067    0.6281  0.6241   0.0009   0.0860  0.4787   -0.0035  -0.0011
 105   3   5000.    5005.    0.0107    0.6287  0.6247   0.0021   0.0884  0.4787   -0.0029  -0.0012

0.0018    0.0020    0.4864           0.0000    0.4902    0.4787
 106   1   5002.    4987.   -0.0321    0.6243  0.6555   0.0002   0.1194  0.4942    0.0048   0.0006
 106   2   5007.    4987.   -0.0149    0.6243  0.6552   0.0009   0.1305  0.4962    0.0076   0.0020
 106   3   5004.    4989.   -0.0341    0.6246  0.6554   0.0021   0.1226  0.4948    0.0056   0.0011

-0.0012   -0.0001    0.4864           0.0000    0.4851    0.4962
 107   1   5004.    5017.    0.0282    0.6317  0.6218   0.0002   0.0912  0.4796   -0.0022  -0.0003
 107   2   5004.    5027.    0.0510    0.6343  0.6197   0.0009   0.0795  0.4792   -0.0051  -0.0001
 107   3   5005.    5020.    0.0346    0.6326  0.6212   0.0021   0.0880  0.4795   -0.0030  -0.0001

0.0004    0.0005    0.4864           0.0000    0.4872    0.4792
 108   1   5006.    4994.   -0.0272    0.6259  0.6544   0.0002   0.1190  0.4950    0.0048   0.0016
 108   2   5001.    4989.   -0.0265    0.6247  0.6543   0.0009   0.1060  0.4932    0.0015   0.0005
 108   3   5005.    4993.   -0.0257    0.6257  0.6543   0.0021   0.1136  0.4943    0.0034   0.0012
```

|     |   |       |       | 0.0002  | 0.0008 | 0.4864 |        | 0.0000 | 0.4874 | 0.4932 |        |         |        |
|-----|---|-------|-------|---------|--------|--------|--------|--------|--------|--------|--------|---------|--------|
| 109 | 1 | 5005. | 5021. | 0.0340  | 0.6328 | 0.6210 | 0.0002 | 0.0850 | 0.4800 |        |        | -0.0038 | 0.0001 |
| 109 | 2 | 5009. | 5010. | 0.0024  | 0.6300 | 0.6229 | 0.0009 | 0.1034 | 0.4816 |        |        | 0.0009  | 0.0008 |
| 109 | 3 | 5009. | 5017. | 0.0170  | 0.6318 | 0.6217 | 0.0021 |        | 0.0957 | 0.4812 |        | -0.0011 | 0.0008 |

|     |   |       |       | 0.0007  | 0.0020 | 0.4864 |        | 0.0000 | 0.4891 | 0.4816 |        |         |        |
|-----|---|-------|-------|---------|--------|--------|--------|--------|--------|--------|--------|---------|--------|
| 110 | 1 | 5009. | 4993. | -0.0345 | 0.6258 | 0.6532 | 0.0002 | 0.1195 | 0.4954 |        |        | 0.0049  | 0.0021 |
| 110 | 2 | 5008. | 5004. | -0.0080 | 0.6286 | 0.6517 | 0.0009 | 0.1114 | 0.4949 |        |        | 0.0028  | 0.0020 |
| 110 | 3 | 5006. | 5001. | -0.0110 | 0.6277 | 0.6520 | 0.0021 |        | 0.1068 | 0.4941 |        | 0.0017  | 0.0015 |

ITAE =         70.4637           1909.9666          67.1136   110

```
0001: 0000   C      STACK DAMPER CONTROL PROGRAM
0002:        C
0003:               REAL SETPNT(3),DAMPOSN(3),RESET(3),IN,MATR(3,3),DELDAMP(3)
0004:               REAL GAIN(3),RESTM(3),PPIT(3),HYST(3),PSTERR(3)
0005:               REAL ITAE(3),FACT(3),LLAGOUT,LAGGAIN,LDLGCOEF(5),LDLGLMT(2)
0006:               REAL HAND(3),LLAGTIM(3),LLAGREG(3),PASTDMP(3),GSDMND(3),GSCORAT(3)
0007:               INTEGER MANUAL(3)
0008:               LOGICAL COVER(3)
0009:               DATA HYST/0.005,0.005,0.005/
0010:               DATA MATR/1.,.05,.05,.05,1.,.05,.05,.05,1./
0011:        C
0012:        C      LOOP TO BE EXERCISED FOR EACH OF THE THREE PIT PRESSURE CONTROL
0013:        C      SUBSYSTEMS
0014:        C
0015:               DO 3 I=1,3
0016: 0002   C
0017:        C      LEAD/LAG ALGORITHM
0018:        C
0019: 0004          FLEW=GSCORAT(I)*GSDMND(I)
0020:               DMPN=.14162E-03*FLEW-.45755E-07*FLEW**2+.73745E-11*FLEW**3
0021:        C
0022:               IN=ABS(DMPN-PASTDMP(I))
0023:               OUT=LDLGCOEF(1)*IN+LDLGCOEF(2)*PSTERR(I)
0024:               TEMP=ABS(IN/PSTERR(I))
0025:               IF(TEMP.LT.0.100) OUT=0.0
0026: 0065          OUT=OUT+LDLGCOEF(3)*LLAGREG(I)
0027:               PASTDMP(I)=DMPN
0028:               LLAGREG(I)=OUT
0029:               PSTERR(I)=IN
0030:               FFWD=DMPN+OUT
0031:               IF(FFWD.LT.LDLGLMT(1)) FFWD=LDLGLMT(1)
0032: 0098          IF(FFWD.GT.LDLGLMT(2)) FFWD=LDLGLMT(2)
0033: 00A5          IF(TEMP.LT.0.100) DELRESET=0.0
0034: 00AE          IF(DELRESET.EQ.0.0) GO TO 10
0035: 00B5          DELRESET=(1.-LDLGCOEF(3))*LLAGREG(I)
0036:        C
0037:        C      CONTROLLER - VELOCITY ALGORITHM
0038:        C
0039: 00C3       10 DELDAMP(I)=0.0
0040:               SETPT =SETPNT(I)+ACONST*TOTAIR
0041:               ERR=(PPIT(I)-SETPT)/(4.*DELTEE)
0042:               DD=DMPN
0043:               GAINT=GAIN(I)*(-0.01855+0.160850*DD+1.527*DD**2)/1.5262
0044:               FACT(I)=GAINT*ERR
0045:               IF(MANUAL(I).EQ.0) GO TO 67
0046: 0126          IF(COVER(I)) GO TO 66
0047: 012C          DELDAMP(I)=0.05-DAMPOSN(I)
0048:               DAMPOSN(I)=0.05
0049:               GO TO 65
0050: 0145   C
0051:        C      MANUAL TRACKING MODE
0052:        C
0053: 0146       67 DELDAMP(I)=HAND(I)-DAMPOSN(I)
0054:               DAMPOSN(I)=HAND(I)
0055: 0167       65 RESET(I)=DAMPOSN(I)-FACT(I)
0056:               LLAGREG(I)=0.0
0057:               GO TO 3
0058: 0188       66 CONTINUE
0059:        C
0060:        C      PROPORTIONAL PLUS RESET CONTROLLER ALGORITHM
0061:        C
0062:               RESET(I)=RESET(I)+ERR*DELTEE/RESTM(I)+DELRESET
0063:               TEMP=RESET(I)+FFWD+FACT(I)
0064:               TEMP1=TEMP
0065:               IF(TEMP.GT.1.0) TEMP=1.0
0066: 01BF          IF(TEMP.LT.0.01) TEMP=0.01
0067: 01C8          IF(TEMP.EQ.TEMP1) GO TO 5
0068: 01CF          RESET(I)=TEMP-FFWD-FACT(I)
0069: 01E1        5 DELDAMP(I)=TEMP-DAMPOSN(I)
0070: 01F5        3 CONTINUE
0071:        C
```

```
0072:              C     DECOUPLING ALGORITHM
0073:              C
0074:   01F8             DO 20 I=1,X
0075:   01FD             TOT=0.0
0076:                    DO 21 J=1,X
0077:   0203       21    TOT=TOT-DE::AMP(J)*MATR(I,J)
0078:   021A             AA=HYST(I)
0079:                    IF(TOT.LT.',.') AA=-AA
0080:   022B             IF((TOT/AA).GT.1.0) AA=0.0
0081:   023C             DAMPOSN(I)=DAMPOSN(I)+TOT+AA
0082:   0249       20    CONTINUE
0083:   024D             END

PGM SIZE: 0598  POOL SIZE: 0255  ERRORS: 0000  VERSION: 12  BINARY RECS: 0000
```

I claim:

1. In apparatus for the operational control of a non-linear process having a control member determining that operation in response to an input desired operation parameter, the combination of
    first means for providing feedback control of said control member in accordance with said desired operation parameter,
    second means for sensing a monotonic external disturbance tending to either increase or decrease said process operation level,
    third means for providing a feed-forward first control signal in accordance with said external disturbance,
    fourth means responsive to and modifying said first control signal in accordance with a predetermined absolute lead/lag characteristic such that, when said external disturbance tending to increase said process operation level occurs, a first positive signal component is added to said first control signal, which component is maintained until after that disturbance ceases and is then allowed to gracefully decay once said process operation level approaches steady state, and, when said external disturbance tending to decrease said process operation level occurs, a second positive signal component is added to said first control signal, which component is maintained until after that disturbance ceases and is then allowed to gracefully decay once said process operation level approaches steady state, said fourth means providing a second control signal so modified,
    with said first means being responsive to the provision of said second control signal for determining the operation of the control member.

2. The control apparatus of claim 1 for an industrial process including a combustion chamber having a pressure, with said lead/lag characteristic establishing the second control signal to control the operation of the control member during transient combustion chamber pressure conditions.

3. The control apparatus of claim 1 for an industrial process including a combustion chamber having a pressure and with the control member being an exhaust damper, with said lead/lag characteristic providing a leading damper control position during increases in said combustion pressure and providing a lagging damper control position during decreases in said combustion pressure.

4. The control apparatus of claim 1 for an industrial process including a combustion chamber having an input fuel gas demand, with said external disturbance being the fuel gas demand.

5. The control apparatus of claim 1 including:
    fifth means for providing a third control signal responsive to the actual operation of the control member, and
    variable gain control means responsive to said third control signal and coupled with said first means for providing a predetermined gain variation in said first means.

6. The control apparatus of claim 5, with said control means having a gain that is increased in accordance with increases in said process operation.

7. The control apparatus of claim 5, with the gain of said control means being increased to provide an increased amount of movement of said control member in accordance with each increase in the open position of the control member.

8. In a method of controlling a non-linear industrial process operation including at least one control member, the steps of:
    sensing the actual operation of said process,
    sensing a monotonic external disturbance tending to either increase or decrease the level of said process operation,
    establishing a desired operation of said control member in response to said actual operation and in accordance with said external disturbance and a predetermined absolute lead/lag characteristic, and
    controlling the movement of said control member in accordance with the desired operation of the control member, and the actual operation of said process to provide a leading opening movement during said external disturbance tending to increase said process operation level, said leading opening movement being maintained until after that disturbance ceases and then allowed to gracefully decay once said process operation level approaches steady state, and to provide a lagging closing movement during said external disturbance tending to decrease said process operation level, said lagging closing movement being maintained until after that disturbance ceases and then allowed to gracefully decay once said process operation level approaches steady state.

9. The method of claim 8, including sensing the actual position of the control member, and controlling the position movement of said control member in response to the actual position of the control member.

10. The method of claim 8, including sensing the actual position of the control member, and providing a variable gain relationship for controlling the position movement of the control member in response to said actual position.

11. The method of claim 10 with said gain increasing in accordance with each increase in said process operation.

* * * * *